(12) United States Patent
Erno et al.

(10) Patent No.: US 10,774,191 B2
(45) Date of Patent: Sep. 15, 2020

(54) ELECTRO-OPTICAL DEVICE HAVING A TRANSPARENT ION EXCHANGE MEMBRANE

(71) Applicant: Gentex Corporation, Zeeland, MI (US)

(72) Inventors: Zachary B. Erno, Grand Rapids, MI (US); Leroy J. Kloeppner, Jenison, MI (US); Sue F. Franz, Holland, MI (US); Joel C. Nemes, Holland, MI (US); Garret C. Denolf, Grand Rapids, MI (US); Nathan P. Boogaart, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 223 days.

(21) Appl. No.: 16/058,526

(22) Filed: Aug. 8, 2018

(65) Prior Publication Data
US 2019/0048159 A1    Feb. 14, 2019

Related U.S. Application Data

(60) Provisional application No. 62/542,570, filed on Aug. 8, 2017.

(51) Int. Cl.
*C08J 5/22* (2006.01)
*G02F 1/15* (2019.01)
*G02F 1/1503* (2019.01)

(52) U.S. Cl.
CPC ........... *C08J 5/2256* (2013.01); *C08J 5/2243* (2013.01); *G02F 1/1503* (2019.01); *C08J 2329/14* (2013.01); *C08J 2363/00* (2013.01); *C08J 2371/03* (2013.01); *G02F 2001/164* (2019.01)

(58) Field of Classification Search
CPC .... C08J 5/2243; C08J 5/2256; C08J 2329/14; C08J 2363/00; C08J 2371/03; G02F 1/1521; G02F 2001/1519
See application file for complete search history.

(56) References Cited

U.S. PATENT DOCUMENTS

| | | |
|---|---|---|
| 3,453,038 A | 7/1969 | Kissa et al. |
| 4,902,108 A | 2/1990 | Byker |
| 5,940,201 A | 8/1999 | Ash et al. |
| 5,998,617 A | 12/1999 | Srinivasa et al. |
| 6,188,505 B1 | 2/2001 | Lomprey et al. |
| 6,635,194 B2 | 10/2003 | Kloeppner et al. |
| 6,710,906 B2 | 3/2004 | Guarr et al. |
| 7,428,091 B2 | 9/2008 | Baumann et al. |

(Continued)

FOREIGN PATENT DOCUMENTS

| | | | |
|---|---|---|---|
| WO | WO-2016/145120 A1 | 9/2016 | |
| WO | WO-2016145120 A1 * | 9/2016 | ........... G02F 1/1533 |

OTHER PUBLICATIONS

International search report and written opinion issued for PCT/US2018/045798, dated Nov. 22, 2018.

*Primary Examiner* — Bijan Ahvazi
(74) *Attorney, Agent, or Firm* — Foley & Lardner LLP; Bradley D. Johnson

(57) ABSTRACT

An electrochromic device includes a cathodic compartment including a cathodic material; an anodic compartment including an anodic material; and a transparent, ion-selective membrane displaced between the cathodic compartment and the anodic compartment wherein the transparent, ion-selective membrane is a cationic polymer.

19 Claims, 4 Drawing Sheets

(56) References Cited

U.S. PATENT DOCUMENTS

| | | | |
|---|---|---|---|
| 2011/0082264 A1* | 4/2011 | Selifonov | C07D 407/12 |
| | | | 525/434 |
| 2014/0138589 A1* | 5/2014 | Hayano | C08G 65/24 |
| | | | 252/511 |
| 2015/0076390 A1* | 3/2015 | Kloeppner | G02F 1/1503 |
| | | | 252/62.2 |
| 2015/0346573 A1 | 12/2015 | Theiste et al. | |

* cited by examiner

ELECTRO-OPTICAL DEVICE HAVING A TRANSPARENT ION EXCHANGE MEMBRANE

CROSS-REFERENCE TO RELATED APPLICATIONS

This application claims the benefit of U.S. Provisional Patent Application No. 62/542,570 filed on Aug. 8, 2017, the entire contents of which are incorporated herein by reference.

FIELD

The present technology is generally related to electrooptical devices. More particularly, it is related to electrochromic devices having a persistent color memory for a substantial time period once being charged and after voltage removed. The present technology is also related to polymeric materials and ion exchange or ion selective membranes.

SUMMARY

In one aspect, a cationic polymer is provided as represented by Formula I, Formula II, or Formula III:

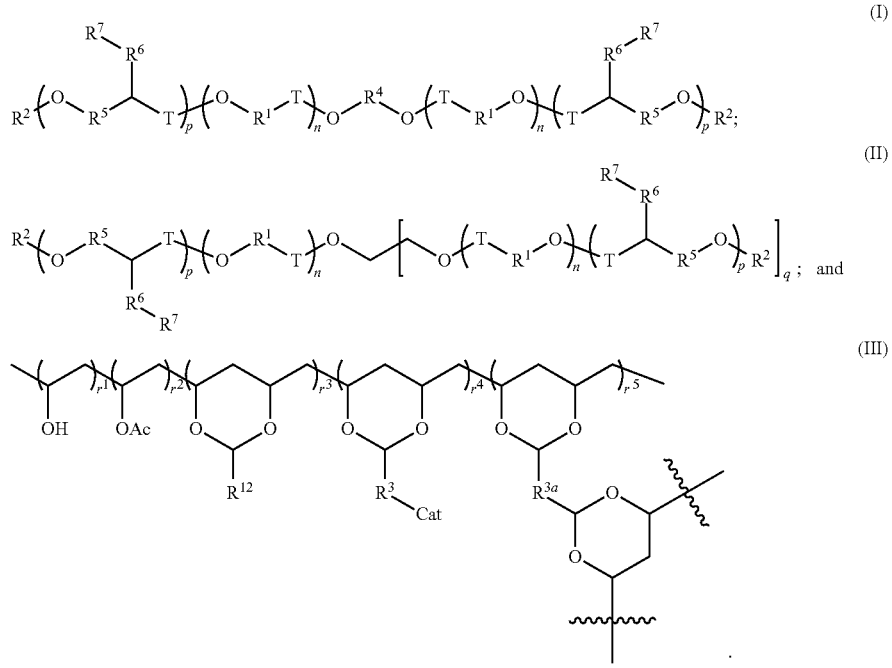

each $R^7$ may be individually a group of formula:

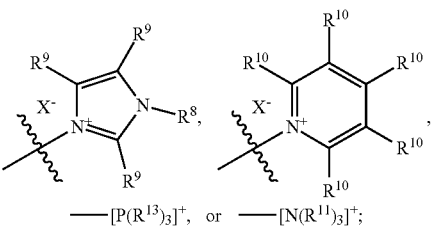

$R^8$ is individually alkyl, cycloalkyl, or heterocycloalkyl;

each $R^9$ may be individually H, F, Br, Cl, $NO_2$, alkyl, cycloalkyl, alkoxy, aryl, or heteroaryl, or any two individual $R^9$ groups may join together to form a ring which may be saturated or unsaturated;

each $R^{10}$ may be individually H, F, Br, Cl, $NO_2$, alkyl, cycloalkyl, alkoxy, aryl, or heteroaryl, or any two individual $R^{10}$ groups may join together to form a ring which may be saturated or unsaturated;

each $R^{11}$ may be individually alkyl, cycloalkyl, aryl, or heteroaryl, or any two individual $R^{11}$ groups may join together to form a ring which may be saturated or unsaturated;

In the above formulae:

each $R^1$ may be individually alkylene, cycloalkylene, or heterocycloalkylene;

$R^2$ may be H;

each $R^3$ may be individually absent, —O—, or -alkyl-;

each $R^{3a}$ may may be individually -alkyl-;

each $R^4$ may be individually alkylene, cycloalkylene, or heterocycloalkylene;

each $R^5$ may be individually absent or alkylene, cycloalkylene, or heterocycloalkylene;

each $R^6$ may be individually absent or alkylene;

each $R^{12}$ may be individually H or alkyl;

each $R^{13}$ may be individually alkyl or aryl;

each Cat is a cationic group;

each $X^-$ may be individually an anion;

each n, p, and $r^{1-5}$ indicate a repeat unit of the polymer;

each q may be individually 1, 2, or 3;

each T may be individually absent, C(O), or $CH_2$; and each T' may be individually absent or C(O).

In some embodiments of the above formulae, each $R^1$ may be individually $C_1$-$C_6$ alkylene, $C_3$-$C_{16}$ cycloalkylene, or $C_3$-$C_{16}$ heterocycloalkylene; $R^2$ may be H; each $R^3$ may be individually $C_1$-$C_6$ alkyl, $C_3$-$C_{16}$ cycloalkyl, or $C_3$-$C_{16}$ heterocycloalkyl; each $R^4$ may be individually $C_1$-$C_6$ alkylene, $C_3$-$C_{16}$ cycloalkylene, or $C_3$-$C_{16}$ heterocycloalkylene; each $R^5$ may be individually absent or $C_1$-$C_6$ alkylene, $C_3$-$C_{16}$ cycloalkylene, or $C_3$-$C_{16}$ heterocycloalkylene; each $X^-$ may be individually an anion; and q is 2.

In some embodiments of the above formulae, each Cat may be a cationic cyclic group, a cationic heterocyclyl group, a cationic aryl group, or a cationic heteroaryl group. Illustrative Cat groups include a pyridinium group that is attached to $R^3$ (or to the acetal group if $R^3$ is absent), at the 1 (i.e. the nitrogen position), 2, 3, 4, 5, or 6 position of the pyridinium ring, an imidazolium group that is attached to $R^3$ (or to the acetal group if $R^3$ is absent), at the 1, 2, 3, 4, or 5-position of the imidazolium ring, or a phenyl ring with a phosphonium or ammonium substituent. In some embodiments, the Cat group is a group of one of the following:

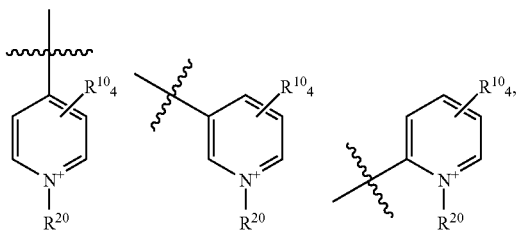

where $R^{20}$ is H, alkyl, cycloalkyl, or heterocycyl. In some embodiments, the Cat group is:

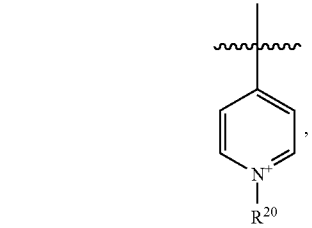

where $R^{20}$ is H, alkyl, cycloalkyl, or heterocycyl. In some embodiments, $R^3$ is absent and the Cat group is a group of one of the following:

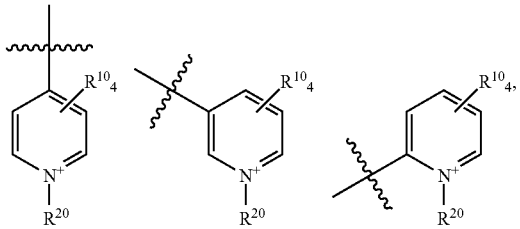

where $R^{20}$ is H, alkyl, cycloalkyl, or heterocycyl. In some embodiments, $R^3$ is absent the Cat group is:

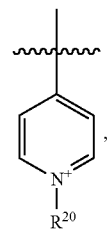

where $R^{20}$ is H, alkyl, cycloalkyl, or heterocycyl.

In any embodiments of the above formulae, $R^6$ may be —$CH_2$—. In any embodiments of the above formulae, $R^{3a}$ may be —$CH_2$—, —$CH_2CH_2$—, —$CH_2CH_2CH_2$—, —$CH_2CH_2CH_2CH_2$—, —$CH_2CH_2CH_2CH_2CH_2$—, or —$CH_2CH_2CH_2CH_2CH_2CH_2$—.

In another aspect, an electrochromic device includes a cathodic compartment including a cathodic material; an anodic compartment including an anodic material; and a transparent, ion-selective membrane displaced between the cathodic compartment and the anodic compartment; wherein the transparent, ion-selective membrane includes a cationic polymer. In some embodiments of the device, the cationic polymer includes ammonium, phosphonium, pyridinium, or imidazolium functionality; and an oxygenated backbone. In some embodiments, the electrochromic devices includes any of the cationic polymers described herein by any one or more of Formula I, Formula II, or Formula III. In some embodiments, the transparent, ion-selective membrane comprises an anionic polymer and one or both the cathodic and anodic materials are anions in the activated state. In other embodiments, the transparent, ion-selective membrane comprises a cationic polymer and one or both the cathodic and anodic materials are cations in the activated state.

DETAILED DESCRIPTION

Figure 1:
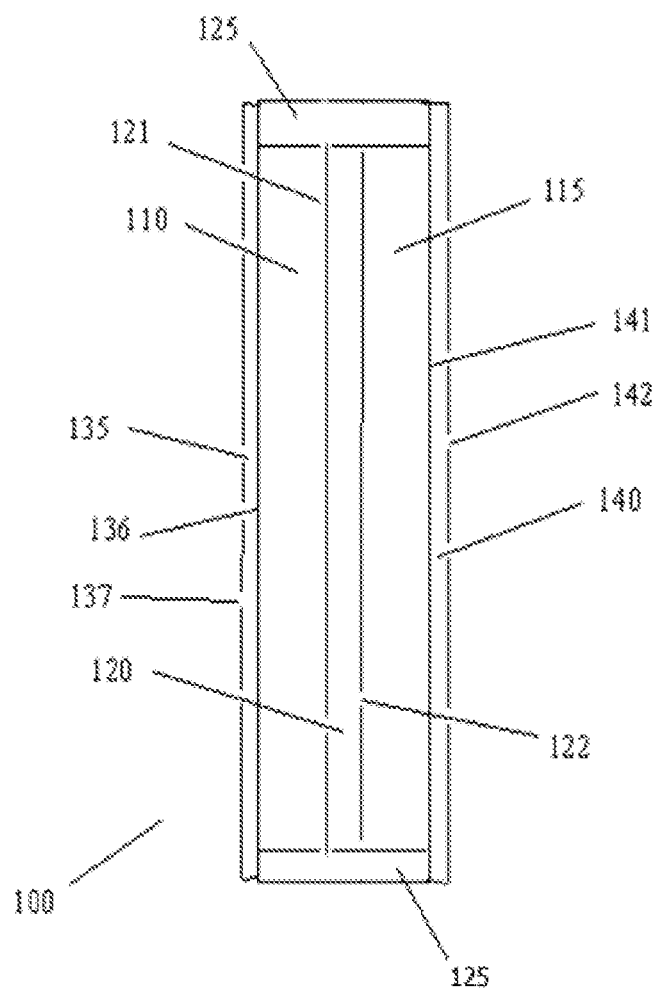
FIG. 1 is a cross-sectional view of an electrochromic device, according to one embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 2 to 12 carbons, or, typically, from 2 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Unless expressly stated otherwise, reference to any group, e.g. alkyl, aryl, heteroaryl, heterocyclyl, cyclyl, alkenyl, alkynyl, etc, includes reference to both substituted and unsubstituted such groups.

One of the advantages of solution-based electrochromic devices is that they are very stable to chemical durability testing (weathering). However, one disadvantage, at least for some applications, for a single-compartment, self-erasing, solution-based electrochromic device is that constant power is needed to be applied to a device in order for it to remain in the darken state. The constant power consumption makes some applications difficult or prohibitive. Herein is provided a multi-compartment device that is able to maintain a darkened, or low-transmission state, at open circuit. The multi-compartment devices include a cathodic compartment and an anodic compartment, with a separator layer therebetween. Additionally, the separator layer includes a colorless, or at least nearly colorless, transparent, chemically stable, ion exchange membrane. Such membranes allow for the free diffusion of an electrolyte of a particular charge through the membrane, but prohibit (or at least significantly impede) the free passage of the opposite charge. For example, if the membrane is a cationic membrane, it will allow for passage of anions while excluding cations, and vice versa. Thus, where the device is in an electrochemically active and/or darkened state, passage of one charged type of ion is allowed while impeding the passage of the opposite charged ion.

In the devices described herein, the anodic and cathodic redox active materials should be soluble ionic compounds of the same charge (i.e. negative or positive), while in the electrochemically active and/or darkened state and the membrane separating the redox active media should only allow passage of the opposite charge, either from a supporting electrolyte or the counter-ion associated with the electrochromic material(s). For example, if the cathodic and/or anodic materials are both positively charged in the active and/or darkened state, the ion exchange membrane should be an anion exchange membrane. Alternatively, if the cathodic and anodic materials are both negatively charged in the active and/or darkened state, the ion exchange membrane should be a cation exchange membrane. The electrolyte of the opposite charge to the membrane may be either from a supporting electrolyte and/or the counter-ion from either redox electroactive anodic or cathodic material. Once the device is subjected to a charging event and the device achieves a low transmission state, the device should maintain the low transmission state and not be self-erasing for a specified period of time. The devices allow for no- or very low-power consumption while maintaining the electrochromic device in its low transmission state, either with an applied potential or in open circuit. The decreased power consumption is desired for electrochromic device applications such as architectural windows, sunroofs, and wearable devices such as, without limitation, sunglasses or augmented reality glasses. Additionally, the decreased power will mean decreased current draw resulting in a reduced "irising" effect which can be noticed in self-erasing devices where the outer edge of the device darkens considerably prior to the center of the device darkening.

In one aspect, an electrochromic device includes a cathodic compartment, an anodic compartment, and a transparent, ion-selective membrane displaced between the cathodic compartment and the anodic compartment. Within the anodic compartment is contained an anodic redox active material, and within the cathodic compartment is contained a cathodic redox active material. The transparent, ion-selective membrane may comprise a cationic polymer or an anionic polymer. In some embodiments, the transparent, ion-selective membrane includes a cationic polymer. In some embodiments, the transparent, ion-selective membrane includes an anionic polymer. In some embodiments, the transparent, ion-selective membrane is covalently cross-linked for increased mechanical stability. With regard to the specified period of time that the device should be able to maintain the low transmission state at open circuit, illustrative times include at least 8 hours with a less than 5% increase in transmission, or, in some embodiments, at least 24 hours with a less than 5% increase in transmission. As used herein, transmission is not determined at a singular wavelength, but rather as a total total transmission across the visible spectrum. As noted above, once the device is subjected to a charging event and the device achieves a low transmission state, the device should maintain the low transmission state and not be self-erasing for a specified period of time.

In some embodiments, the transparent, ion-selective membrane is an anionic polymer. For example, the anionic polymer may include Nafion (a sulfonated tetrafluoroethylene). The strongly acidic Nafion can be treated with a base, for example lithium hydroxide, to generate the polyanionic Li$^+$ sulfonate salt, Nafion-Li$^+$. Nafion-Li$^+$ is a capable of conducting small cations but also blocking anionic compounds including negatively charged anodic or cathodic redox active materials.

In some embodiments, the transparent, ion-selective membrane is a cationic polymer having ammonium, pyridinium, phosphonimium or imidazolium functionality; and an oxygenated backbone (i.e. a polymeric backbone with oxygen atoms in the backbone or part of a cyclic structure within the backbone). The cationic polymers may also be cross-linked using a cross-linking agent. Illustrative cationic polymers include, but are not limited to, those polymers represented by Formula I, Formula II, or Formula III:

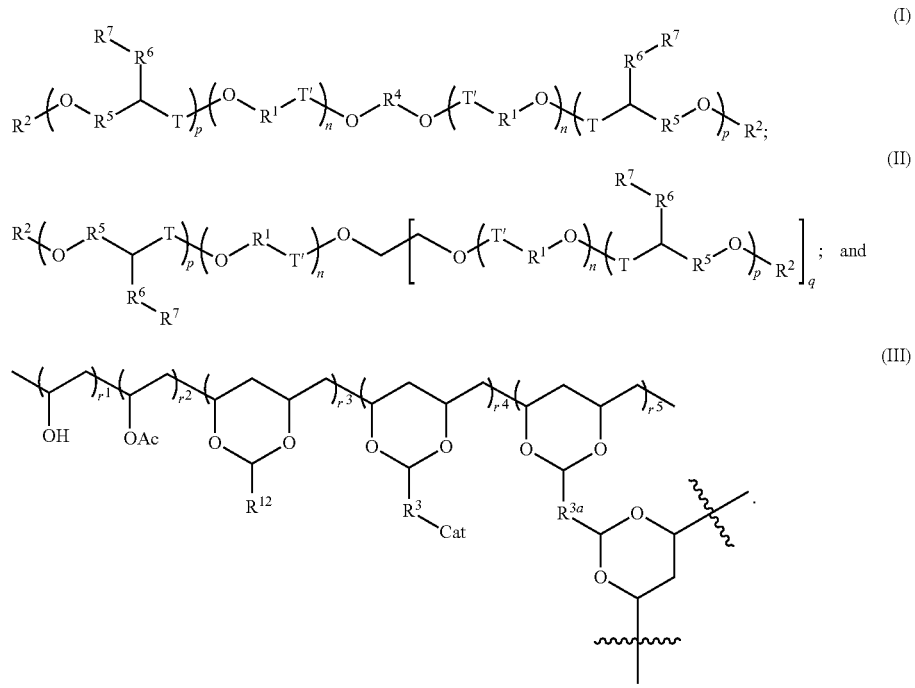

In the above Formulae, each $R^1$ is individually alkylene, cycloalkylene, or heterocycloalkylene; $R^2$ is H; each $R^3$ is individually absent, —O—, or -alkyl-; each $R^{3a}$ is individually -alkyl-; each $R^4$ is individually an alkylene, cycloalkylene, or heterocycloalkylene; each $R^5$ is individually absent, alkylene, cycloalkylene, or heterocycloalkylene; each $R^6$ is individually absent or alkylene; each $R^7$ is individually a group of formula —[P($R^{13}$)$_3$]$^+$, —[N($R^{11}$)$_3$]$^+$,

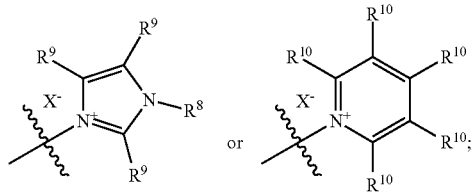

or each Cat is a cationic group; each $X^-$ is individually an anion; each n, p, and $r^{1-5}$ indicate a repeat unit of the polymer; each q is individually 1, 2, or 3; individually T is individually absent, C(O), or CH$_2$; $R^8$ is alkyl, cycloalkyl, or heterocycloalkyl; each $R^9$ is individually H, F, Br, Cl, NO$_2$, alkyl, cycloalkyl, alkoxy, aryl, or heteroaryl, or any two individual $R^9$ groups may join together to form a ring which may be saturated or unsaturated, including fused non-aryl and aryl rings to the pyridine ring to which the $R^9$ groups are attached; each $R^{10}$ is individually H, F, Br, Cl, NO$_2$, alkyl, cycloalkyl, alkoxy, aryl, or heteroaryl, or any two individual $R^{10}$ groups may join together to form a ring which may be saturated or unsaturated, including fused non-aryl and aryl rings to the pyridine ring to which the $R^{10}$ groups are attached; each $R^{11}$ is individually alkyl, cycloalkyl, aryl, or heteroaryl, or any two individual $R^{11}$ groups may join together to form a ring which may be saturated or unsaturated; each $R^{12}$ may be H or alkyl, each $R^{13}$ is individually alkyl or aryl, preferably aryl, more preferably phenyl, and each T' is individually absent or C(O). It is to be understood that the repeat units identified by the parentheticals are merely blocked representations of an indeterminate number of repeat units spaced throughout the polymer. Although no such recitation of specific values is required to accurately represent a polymer, to the extent values must be assigned to each of n, p, and $r^{1-5}$, such values may be from 10 to 100 for n, from 2 to 50 for p, and from 25 to 5,000 for each of $r^{1-5}$ individually. In some embodiments, this includes from 10 to 60 for n, from 4 to 20 for p, and from 1,300 to 3,200 for each of $r^{15}$ individually.

As will be noted, the $R^7$ group, in addition to other potential substituents on the polymer, provides at least one site for incorporation of a cationic portion (i.e. "residue") in the polymer. The cationic residue may be from about 10 mol % to about 50 mol % based upon the repeating units that are designated by the p. This may include from about 10 mol % to about 40 mol %; about 10 mol % to about 35 mol %; about 10 mol % to about 30 mol %; about 15 mol % to about 50 mol %; about 15 mol % to about 40 mol %; about 15 mol % to about 35 mol %; or about 15 mol % to about 35 mol %. In some embodiments, the cationic residue may be from about 15 mol % to about 35 mol % of the polymer. In any of the above embodiments, each $R^7$ may be

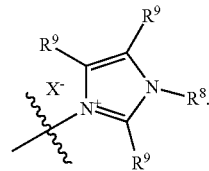

Alternatively, in any of the above embodiments, each $R^7$ may be

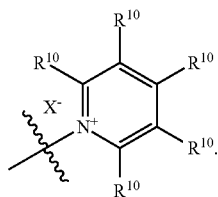

For illustrative purposes, these cations are attached to the polymer backbone through the nitrogen atoms on the cation ring. It can also be anticipated that the cation rings can be covalently bound to the organic cations through the $R^9$ and $R^{10}$ groups on the rings. In some embodiments, each $R^7$ is a —[P($R^{13}$)$_3$]$^+$, where $R^{13}$ is aryl, and in some embodiments phenyl. In some embodiments, each $R^7$ is a —[N($R^{11}$)$_3$]$^+$, where $R^{11}$ is $C_1$-$C_8$ alkyl.

In any of the above embodiments with regard to Formulae I and II, each $R^1$ may individually be a $C_1$-$C_6$ alkylene, $C_3$-$C_{16}$ cycloalkylene, or $C_3$-$C_{16}$ heterocycloalkylene; each $R^3$ may individually be $C_1$-$C_6$ alkyl, $C_3$-$C_{16}$ cycloalkyl, or $C_3$-$C_{16}$ heterocycloalkyl; each $R^4$ may individually be a $C_1$-$C_6$ alkylene, $C_3$-$C_{16}$ cycloalkylene, or $C_3$-$C_{16}$ heterocycloalkylene; each $R^5$ may individually be absent or $C_1$-$C_6$ alkylene, $C_3$-$C_{16}$ cycloalkylene, or $C_3$-$C_{16}$ heterocycloalkylene; and each $X^-$ may individually be an anion. Illustrative examples of anions include, but are not limited to, $F^-$, $Cl^-$, $Br^-$, $I^-$, $BF_4^-$, $PF_6^-$, $SbF_6^-$, $AsF_6^-$, $ClO_4^-$, $SO_3CF_3$, $N(CF_3SO_2)_2$, $C(CF_3SO_2)_3$, triflate (trifluoromethansulfonate), $N(SO_2C_2F_5)^-$, $BAr_4^-$, and a mixture of any two or more such anions, wherein Ar is an aryl or fluorinated aryl or a bis(trifluoromethyl)aryl group.

In some embodiments of the above formulae, each Cat may be a cationic cyclic group, a cationic heterocyclyl group, a cationic aryl group, or a cationic heteroaryl group. Illustrative Cat groups include a pyridinium group that is attached to $R^3$ (or to the acetal group if $R^3$ is absent), at the 1 (i.e. the nitrogen position), 2, 3, 4, 5, or 6 position of the pyridinium ring, an imidazolium group that is attached to $R^3$ (or to the acetal group if $R^3$ is absent), at the 1, 2, 3, 4, or 5-position of the imidazolium ring, or a phenyl ring with a phosphonium or ammonium substituent. In some embodiments, the Cat group is a group of one of the following:

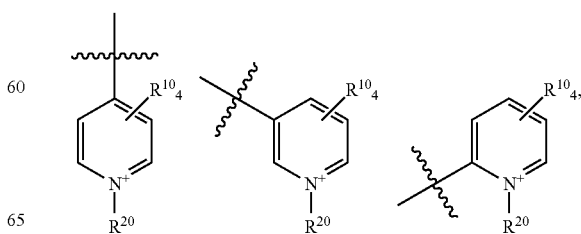

where $R^{20}$ is H, alkyl, cycloalkyl, or heterocycyl. In some embodiments, the Cat group is:

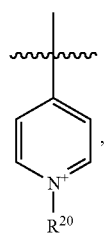

where $R^{20}$ is H, alkyl, cycloalkyl, or heterocycyl. In some embodiments, $R^3$ is absent and the Cat group is a group of one of the following:

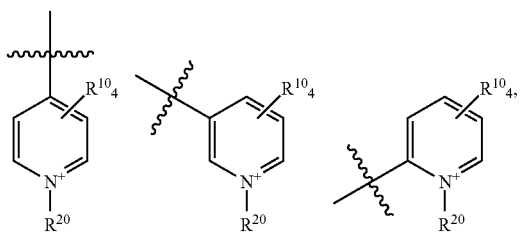

where $R^{20}$ is H, alkyl, cycloalkyl, or heterocycyl. In some embodiments, $R^3$ is absent the Cat group is:

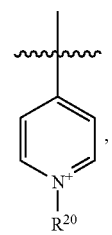

where $R^{20}$ is H, alkyl, cycloalkyl, or heterocycyl.

In any embodiments of the above formulae, $R^6$ may be —$CH_2$—. In any embodiments of the above formulae, $R^{3a}$ may be —$CH_2$—, —$CH_2CH_2$—, —$CH_2CH_2CH_2$—, —$CH_2CH_2CH_2CH_2$—, —$CH_2CH_2CH_2CH_2CH_2$—, or —$CH_2CH_2CH_2CH_2CH_2CH_2$—.

Illustrative compounds according to Formulae I, II, and III, include, but are not limited to those of Formulae IA-D, IIA-D, and IIIA:

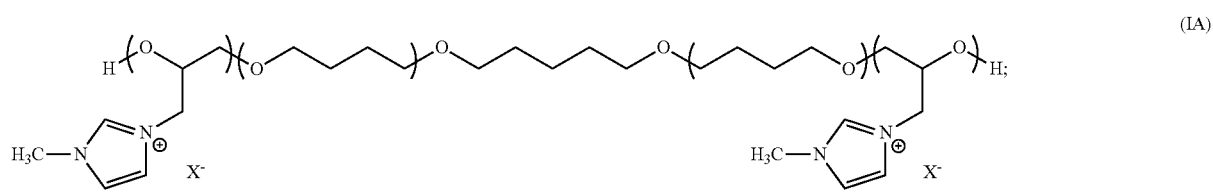

(IA)

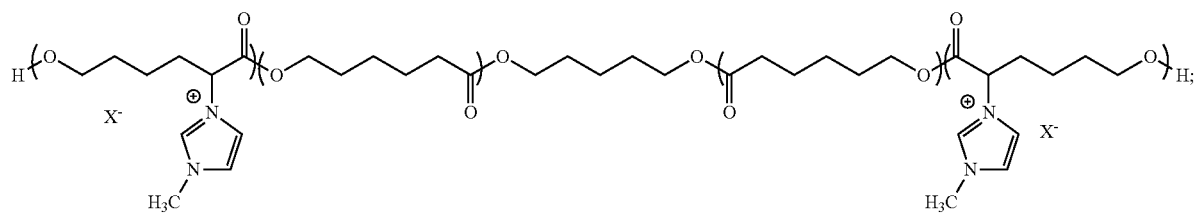

(IB)

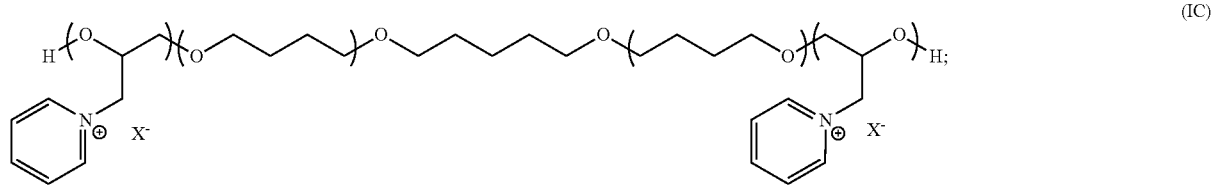

(IC)

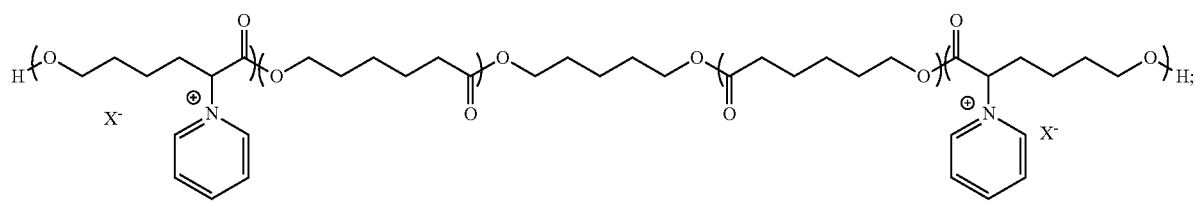

(ID)

(IIA)
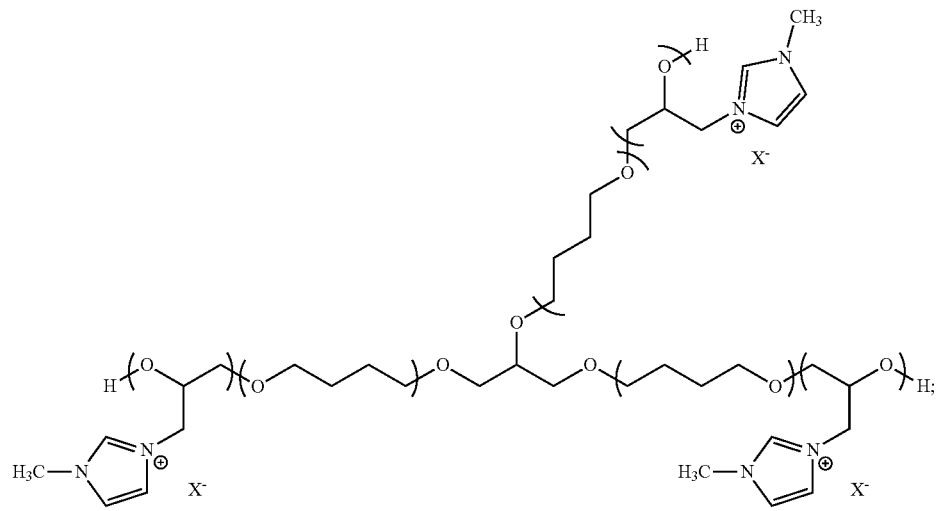
(IIB)
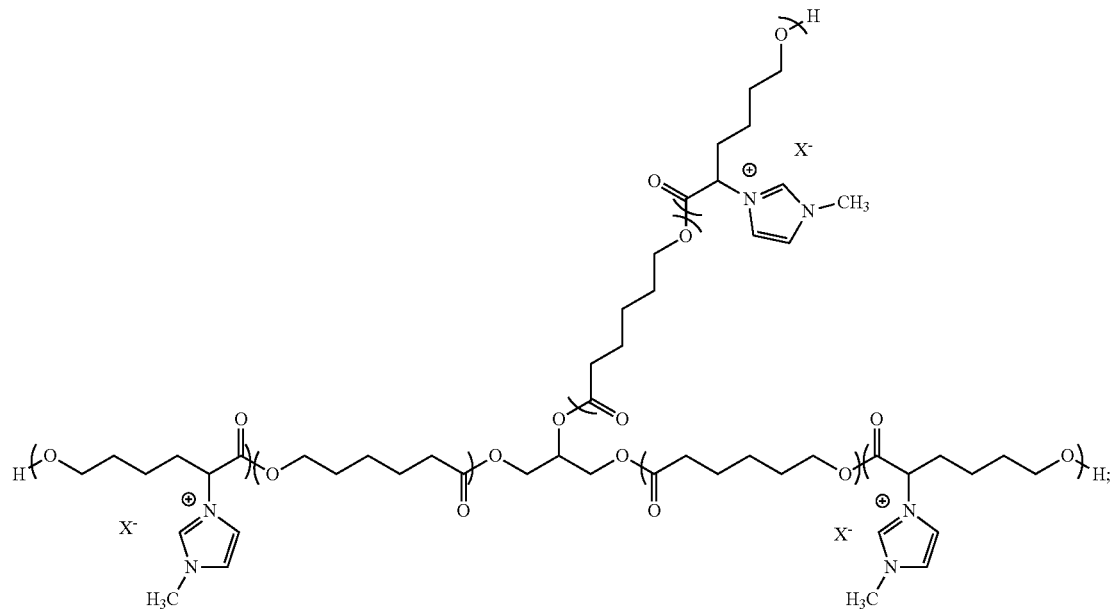
(IIC)
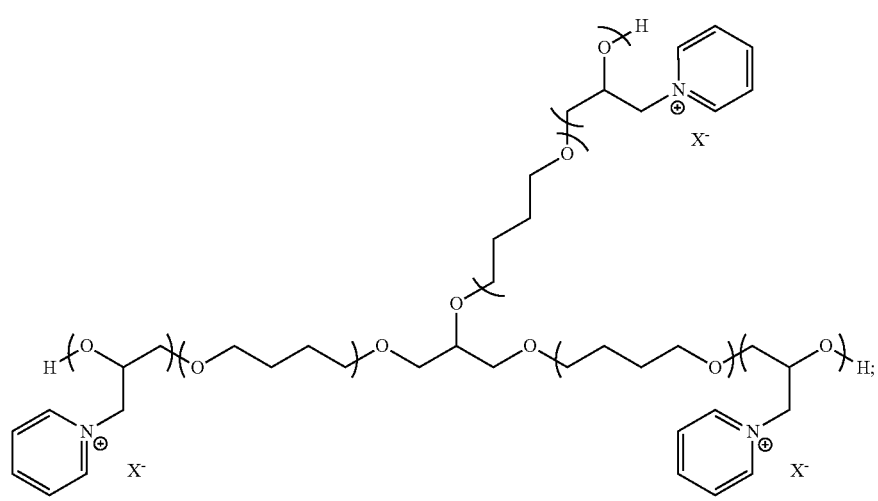

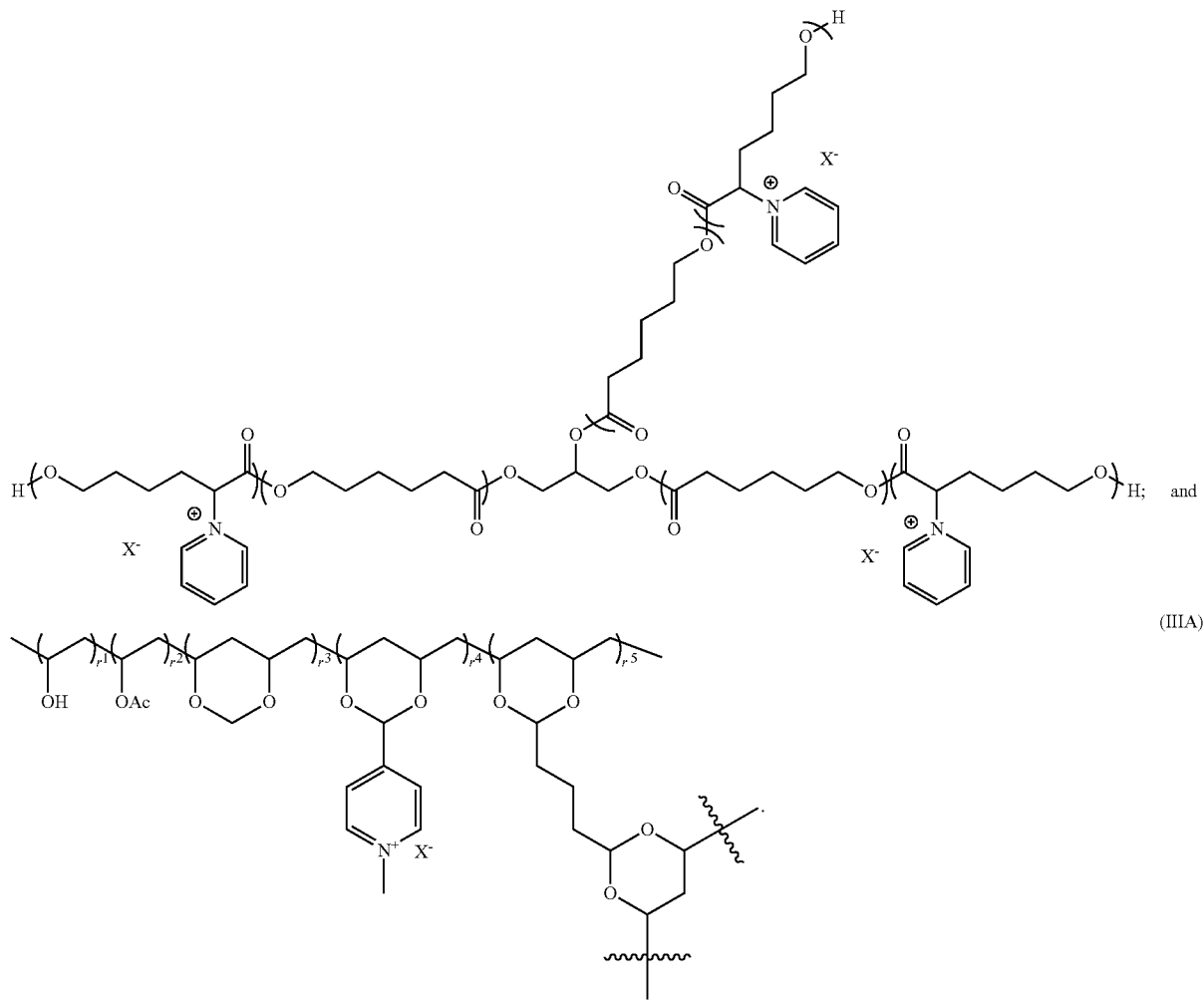

In Formulae IA-D, IIA-D, and IIIA, and as above, the parentheses indicate repeat units of the polymer. To the extent specific values are required, they are stated above.

As noted above, the cationic polymers of the transparent, ion-selective membranes described herein may be further cross-linked with a cross-linking agent. Illustrative cross-linking agents may include, but are not limited to di-, tri- and polyisocyanates. The dioxane linkages depicted in Formula IIIA are acetals formed by reaction of neighboring hydroxyl groups on the polymer backbone with a dialdehyde cross-linking reagent (in this case of Formula IIIA, glutaraldehyde) via acid catalysis. Other acetal cross-links may be similarly formed.

The transparent, ion-selective membranes described herein with regard to the polycaprolactone-based polymers (i.e. illustrated by those with the alkyl esters in the backbone, see e.g. Formula IB, ID, IIB, and IID) may have number average molecular weights from about 10,000 to about 250,000 Daltons. This includes, but is not limited to, illustrative ranges such as from about 50,000 to about 180,000 Daltons; about 50,000 to about 160,000 Daltons; or about 80,000 to about 160,000 Daltons. The transparent, ion-selective membranes described herein with regard to the polyether polyols (i.e. illustrated by those with the alkyl esters in the backbone, see e.g. Formula IA, IC, IIA, and IIC), may have number average molecular weights from about 500 to about 20,000 Daltons. These include, but are not limited to, illustrative ranges such as from about 1,000 to about 12,000 Daltons; about 1,000 to about 8,000 Daltons; or about 1,400 to about 8,000 Daltons.

Referring to FIG. 1, an electrochromic device 100 is described herein. The device 100 includes at least one cathodic chamber 110 and at least one anodic chamber 115. The cathodic chamber 110 is defined by a first substrate 135 having a conductive surface 136 and an outer surface 137, and a cathodic face 121 of a separator layer 120. The anodic chamber 115 is defined by a second substrate 140 having a conductive surface 141 and an outer surface 142, and an anodic face 122 of the separator layer 120, where the separator is a transparent, ion-selective membrane. The conductive surface 136 of the first substrate 135 being joined to the conductive surface 141 of the second substrate 140 by a sealing member 125 (the seal is a unitary element at the perimeter of the device and chambers, despite its apparent separation in the figure).

The cathodic and anodic materials may be in a solution phase, or a gel phase, within the chambers 110, 115; the cathodic material may be confined to the conductive surface 136, while the anodic material is either in solution or confined to the conductive surface 141; or the anodic material may be confined to the conductive surface 141, while the cathodic material is either in solution or confined to the conductive surface 136. Within the chambers 110,115, and within the separator layer 120 is disposed an electrolyte. The electrolyte may include the anodic and/or cathodic materials. The first 135 and second 140 substrates may be off-set with respect to one another to allow for electric contact to be made with their respective conductive surfaces 136, 141, as is well established for other solution phase electrochromic devices.

Figure 2:
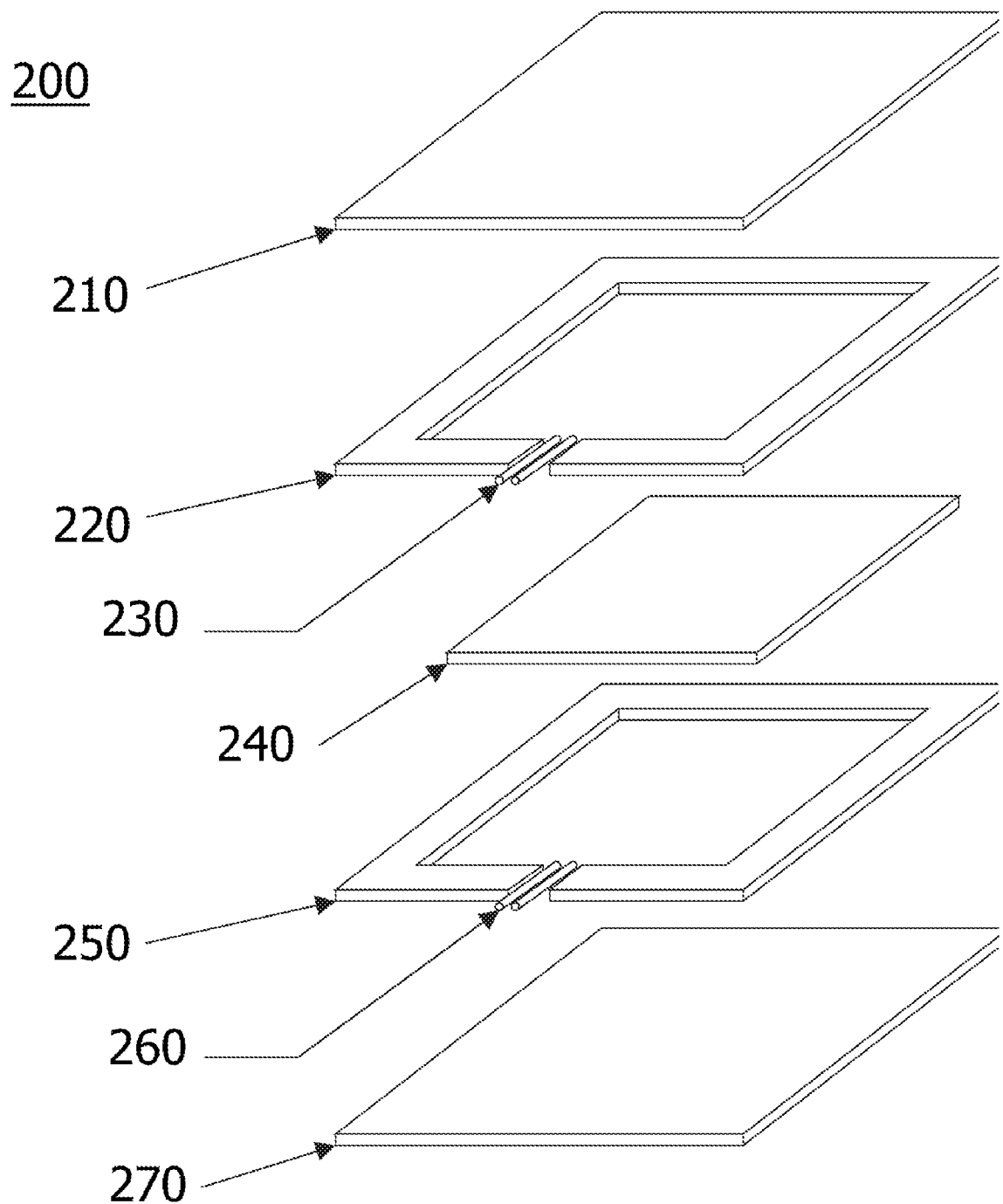
FIG. 2 is an illustration of the layup proceed for forming an electrochromic device, according to one embodiment.

FIG. 2 illustrates a method of constructing devices. As shown in FIG. 2, a device may be constructed of a first substrate 210 and second substrate 270 separated by an ion exchange membrane 240. Both the first substrate 210 and second substrate 270 are coated with a conductive layer on the sides facing the other substrate. Anodic and cathodic chambers are formed by the substrates 210, 270 and the ion exchange membrane 240 separated by gaskets 220, 250. Ion exchange membrane 240 must be strongly bonded to gaskets 220, 250 to withstand pressure differentials during the vacuum assisted backfilling process. Fill ports 230, 260 provide conduits for filing the separate chambers with the anodic/cathodic media under vacuum assisted backfilling. Upon backfilling of the anodic and cathodic media into the chambers, the fill ports are sealed. Adhesive materials, like an epoxy, may be used to bind the first substrate 210 to the first gasket 220, the gasket 220 to a first surface of the ion exchange membrane 240, a second surface of the ion exchange membrane 240 to the second gasket 250, and the second gasket 250 to the second substrate 270. Alternatively, the sizing of the gaskets and ion exchange membrane may be such that the first substrate is directly bonded to the second substrate, but with the binding adhesive binding and/or abutting an outer edge of the gaskets such that each chamber is sealed, but only a single layer of laminating adhesive is observed from an outer edge of the device. The substrates may be made of glass or plastics. The gaskets may likewise be made of glass, plastics, rubbers, and the like. The only limitation of the substrates and gaskets are that the materials they are constructed of are to be compatible with the electrochromic media and adhesive materials.

Figure 3:
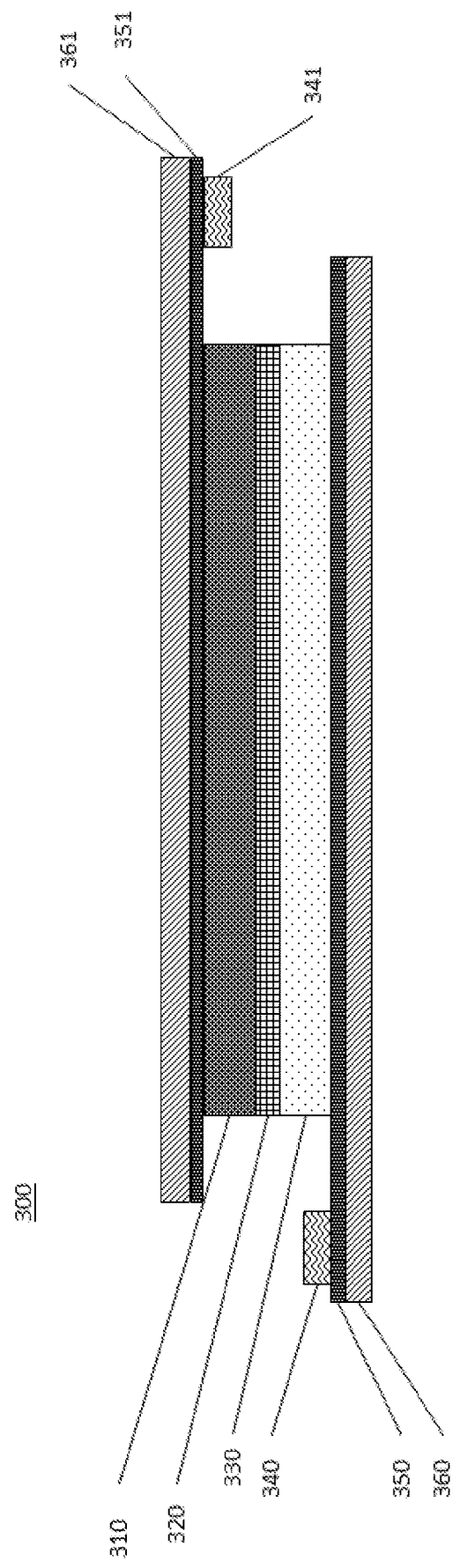
FIG. 3 is a schematic figure of a first alternative layered structure for the electrochromic device, according to one embodiment.
Figure 4:
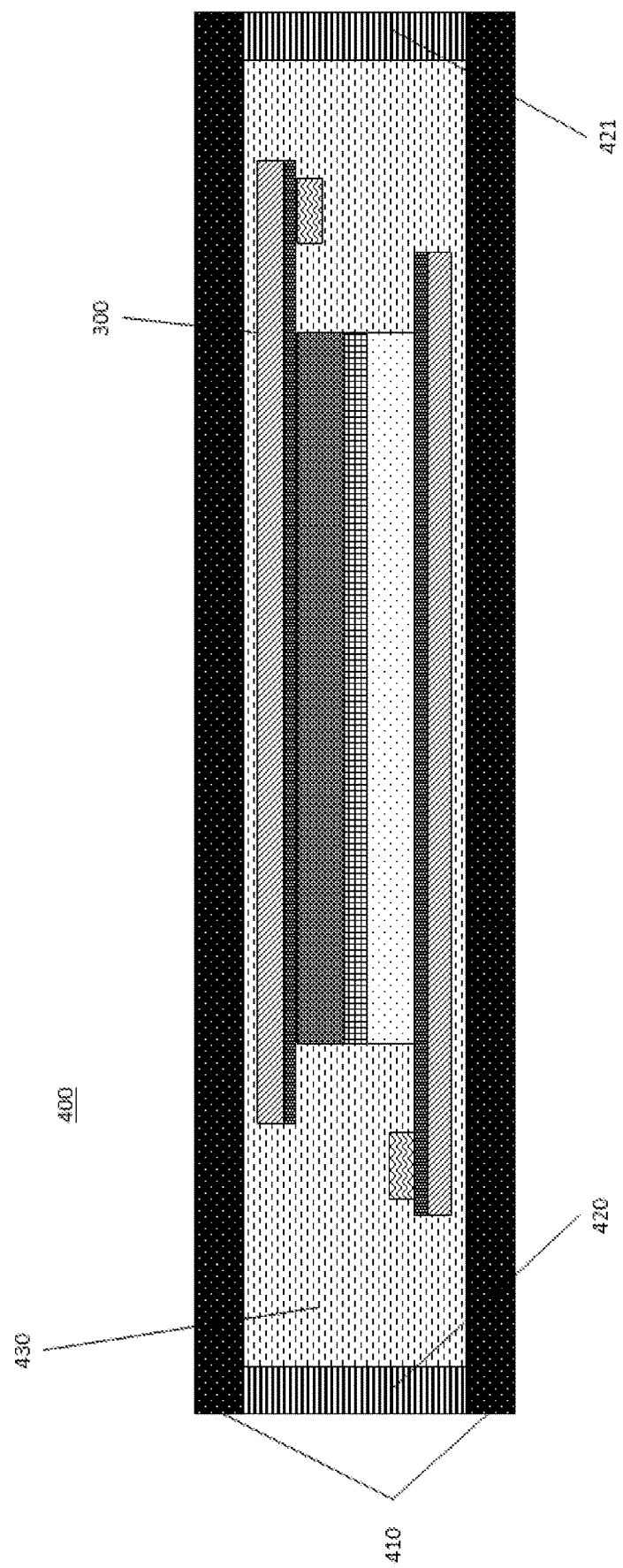
FIG. 4 is a schematic figure of a second alternative layered structure for the electrochromic device, according to one embodiment.

Referring to FIGS. 3 and 4 an alternative structural representation of the electrochromic devices is described. In FIG. 3, an electrochromic device 300 is formed from a layered anodic gel 310 and a cathodic gel 330 separated by a separator layer 320 that is a transparent, ion-selective membrane. Below and above this stack are substrates 360, 361 having conductive layers 350, 351, and bus bar connectors 340, 341. The substrates may be a material such as, but not limited to, polyethyleneterephthalate (PET); the conductive layers may be materials such, but not limited to indium tin oxide; and the bus bars may be made of conductive materials such as metals (i.e. copper, stainless steel, silver, gold, iron, or other metals, alloys of any two or more thereof, or blends of any two or more thereof). FIG. 4 illustrates a device 400 that includes device 300 between further substrates 410 having barrier seals 420, 421 therebetween. Also, with the chamber formed by the further substrates 410 and barrier seals 420, 421, may optionally be a fluid, clear adhesive, or laminate 430. The further substrates may be materials such as glass, while the adhesives may be epoxies, or other adherent, clear materials or laminates such as, but not limited to ethylene-vinyl acetate (EVA) and polyvinylbutyral (PVB).

In any of the above aspects, the cathodic material may be a viologen, a low-dimerizing viologen, a non-dimerizing viologen, or metal oxides such as tungsten oxides as those terms are used in the art. The term low-direrizing viologen is applied to some viologens that show dimerization characteristics to a lesser extent than dimerizing viologens. Illustrative viologens include, but are not limited to, methyl viologen, octyl viologen, benzyl viologen, and polymeric viologens. In addition, further viologens are described in U.S. Pat. Nos. 4,902,108; 6,188,505; 5,998,617; and 6,710,906; and in U.S. Patent Appl. Publication. No. 2015/0346573.

In any of the above aspects, the anodic materials may include, but are not limited to, metallocenes, 5,10-dihydrophenazines, phenothiazines, phenoxazines, carbazoles, triphendioxazines, triphenodithiazines and related compounds. Anodic materials included in the electrochromic medium may include any one of a number of materials including ferrocene, substituted ferrocenes, substituted ferrocenyl salts, phenazine, substituted phenazines, phenothiazine, substituted phenothiazines, including substituted dithiazines, thianthrene, and substituted thianthrenes. Examples of anodic materials may include di-tert-butyl-diethylferrocene, 5,10-dimethyl-5,10-dihydrophenazine (DMP), bis(triethylaminopropyl)dihydrophenazine bis(tetrafluoroborate), 3,7,10-trimethylphenothiazine, 2,3,7,8-tetramethoxy-thianthrene, 10-methylphenothiazine, tetramethylphenazine (TMP), and bis(butyltriethylammonium)-para-methoxytriphenodithiazine (TPDT). The anodic material may include a polymer film, such as polyaniline, polythiophenes, polymeric metallocenes, or a solid transition metal oxide, including, but not limited to, oxides of vanadium, nickel, iridium, as well as numerous heterocyclic compounds, etc. It will be understood that numerous other anodic materials are contemplated for use including those disclosed in U.S. Pat. Nos. 4,902,108; 6,188,505; 6,710,906; and 7,428,091. In another embodiment, at least one of the anodic electroactive material includes a substituted or unsubstituted phenazine compound. In another embodiment, at least one of the anodic electroactive material includes a substituted or unsubstituted 2,7-dialkyl-5,10-dialkyl-5,10-dihydrophenazine compound. In another embodiment, at least one alkyl group of the 5,10-dialkyl groups attached to the phenazine compound includes at least 4 carbon atoms and is void of any β hydrogen atoms, and at least one alkyl group of the 2,7-dialkyl groups attached to the phenazine compound includes at least 4 carbons. In another embodiment, at least one alkyl group of the 5,10-dialkyl groups attached to the phenazine compound includes a substituted or unsubstituted neopentyl group, and at least one alkyl group of the 2,7-dialkyl groups attached to the phenazine compound includes a substituted or unsubstituted isopropyl, isobutyl, (2-ethylbutyl), or (2-propylpentyl) group. In some embodiments, at least one alkyl group of the 5,10-dialkyl groups attached to the phenazine compound includes a neopentyl group, and at least one alkyl group of the 2,7-dialkyl groups attached to the phenazine compound includes a 2-ethyl-1-butanol group. In another embodiment, at least one alkyl group of the 5,10-dialkyl groups attached to the phenazine compound includes a neopentyl group, and at least one alkyl group of the 2,7-dialkyl groups attached to the phenazine compound includes an isobutyl group. In another embodiment, at least one alkyl group of the 5,10-dialkyl groups attached to the phenazine compound also includes a cation like quaternized ammonium or phosphonium group.

As noted above, the electrochromic medium includes a solvent and a salt. In some embodiments, a solvent of the electrochromic medium may include, but is not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, γ-butyrolactone, γ-valerolactone; propylene carbonate (PC), ethylene carbonate; oligoethers; and homogenous mixtures of any two or more such solvents. In another embodiment, the electrochromic composition may include a solvent that includes propylene carbonate. While specific solvents have been disclosed as being associated with the electrochromic composition, numerous other solvents that would be known to those having ordinary skill in the art having the present disclosure before them are likewise contemplated for use. For example, in addition to the solvent, the electrochromic medium may include a polymeric gel composition. Illustrative polymer matrix materials used in electrochromic device gel systems may be found in U.S. Pat. Nos. 6,635,194 and 5,940,201.

The salt may be a metal salt or an ammonium salt. Illustrative salts include, but are not limited to, metal or ammonium salts, such as but not limited to $Li^+$, $Na^+$, $K^+$, $NR'_4{}^+$, where each R' is individually H, alkyl, or cycloalkyl, of the following anions $F^-$, $Cl^-$, $Br^-$, $I^-$, $BF_4{}^-$, $PF_6{}^-$, $SbF_6{}^-$, $AsF_6{}^-$, $ClO_4{}^-$, $SO_3CF_3{}^-$, $N(CF_3SO_2)_2{}^-$, $C(CF_3SO_2)_3{}^-$, $N(SO_2C_2F_5)^-$, $Al(OC(CF_3)_3)_4{}^-$, or $BAr_4{}^-$, wherein Ar is an aryl or fluorinated aryl group such as, but not limited to, $C_6H_5$, $3,5\text{-}(CF_3)_2C_6H_3]_4$, or $C_6F_5$.

The electrochromic devices described herein exhibit a high transmission state at short circuit and a low transmission state upon application of an electric potential. In some embodiments, where the high transmission state is at least 5 times greater than the low transmission state; and the electrochromic device is configured to maintain a transmission percentage within 5% of the low transmission state for at least 8 hours at open circuit after application of a potential sufficient to reach to the low transmissions state. The low transmission state may range from a transmission for the device of about 0.001% to about 30%, while the high transmission state may be from about 50% to about 95%. In some embodiments, after 4000 cycles from the high transmission state to the low transmission state, a high transmission value does not vary by more than 5% from an initial high transmission value. As used herein the initial high transmission value is the state of the device prior to the application of an electric potential after device fabrication. In some embodiments, after 4000 cycles from high transmission to low transmission, the low transmission value does not vary by more than 5% from an initial low transmission value. As used herein, the initial low transmission value is the low transmission value achieved upon the first charging of the device at a full voltage application. As used herein, the transmission refers to transmission of the full visible spectrum and is not limited to a single wavelength.

With regard to the substrates and conductive coatings on the substrates, those typically used in solution-based electrochromic devices may be used. For example, the one or both substrates may be glass, metal, plastic, or ceramic. The conductive coating on one or more of the substrates may be transparent or opaque depending upon the intended use of the device. For example, where the device is a window, both coatings should be substantially transparent, and where the device is a mirror at least one coating is transparent. Illustrative, transparent conductive materials include, but are not limited to, fluorine doped tin oxide (FTO), indium/tin oxide (ITO), doped zinc oxide, indium zinc oxide, metal oxide/Ag/metal oxide, silver nano-wire coatings, carbon nanotubes, graphene coatings, wire grids, conductive polymers such as, but not limited to, poly(3,4-ethylenedioxythiophene) (PEDOT). Non-transparent conductive coatings include metal coatings such as rhodium, chromium, nickel, silver, gold, and other metals, or mixtures of any two or more thereof.

In another aspect, provided herein is a cationic polymer. The cationic polymers may be transparent and may be formed into a membrane as described herein. The cationic polymers may have ammonium, pyridinium, imidazolium, or phosphonium functionality; and an oxygenated backbone. The polymers may also be cross-linked using a cross-linking agent. Illustrative cationic polymers include, but are not limited to, those polymers represented by Formula I, Formula II, or Formula III:

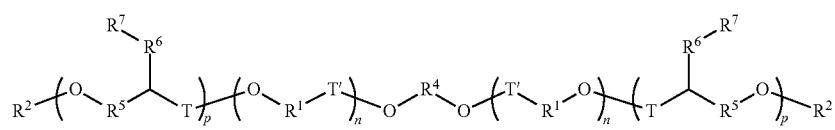

(I)

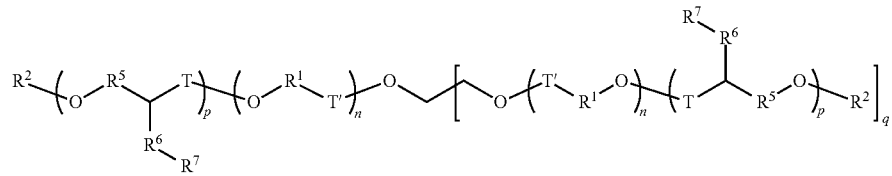

(II)

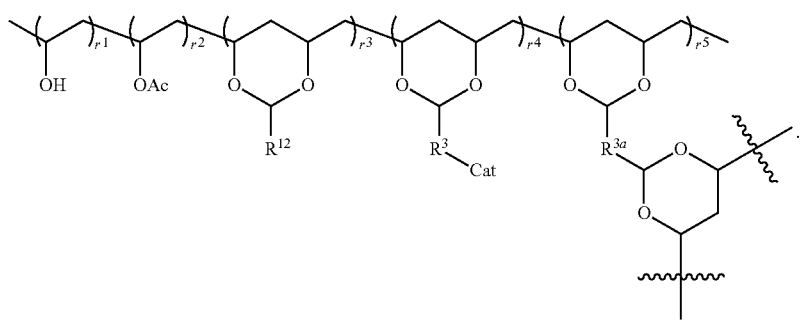

(III)

In the above Formulae, each R' is individually alkylene, cycloalkylene, or heterocycloalkylene; each $R^2$ is H; each $R^3$ is individually absent, —O—, or -alkyl-; each $R^{3a}$ is individually -alkyl-; each $R^4$ is individually an alkylene, cycloalkylene, or heterocycloalkylene; each $R^5$ is individually absent, alkylene, cycloalkylene, or heterocycloalkylene; each $R^6$ is individually absent or alkyene; each $R^7$ is individually a group of formula

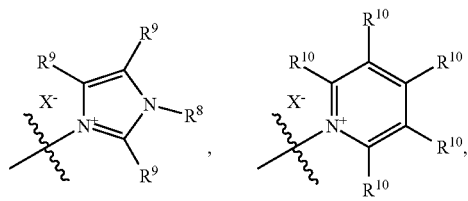

—$[P(R^3)_3]^+$; or —$[N(R^{11})_3]^+$; each Cat is a cationic group; each $X^-$ is individually an anion; each n, p, and $r^{1-5}$ indicate a repeat unit of the polymer; each q is individually 1, 2, or 3; individually T is individually absent, C(O), or $CH_2$; $R^8$ is alkyl, cycloalkyl, or heterocycloalkyl; each $R^9$ is individually H, F, Br, Cl, $NO_2$, alkyl, cycloalkyl, alkoxy, aryl, or heteroaryl, or any two individual $R^9$ groups may join together to form a ring which may be saturated or unsaturated, including fused non-aryl and aryl rings to the pyridine ring to which the $R^9$ groups are attached; each $R^{10}$ is individually H, F, Br, Cl, $NO_2$, alkyl, cycloalkyl, alkoxy, aryl, or heteroaryl, or any two individual $R^{10}$ groups may join together to form a ring which may be saturated or unsaturated, including fused non-aryl and aryl rings to the pyridine ring to which the $R^{10}$ groups are attached; each $R^{11}$ is individually alkyl, cycloalkyl, aryl, or heteroaryl, or any two individual $R^{11}$ groups may join together to form a ring which may be saturated or unsaturated; each $R^{12}$ is individually H or alkyl; each $R^{13}$ is alkyl or aryl, and each T' is individually absent or C(O). It is to be understood that the repeat units identified by the parentheticals are merely blocked representations of an indeterminate number of repeat units spaced throughout the polymer. To the extent values must be assigned to each of n, p, and $r^{1-5}$ solely for the purposes of clarity, such values may be from 10 to 100 for n, from 2 to 50 for p, and from 25 to 5,000 for each of $r^{1-5}$ individually. In some embodiments, this includes from 10 to 60 for n, from 4 to 20 for p, and from 100 to 3,200 for each of $r^{1-5}$ individually. In some embodiments, each $R^{13}$ is phenyl.

As will be noted, the $R^7$ group, in addition to other potential substituents on the polymer, provides at least one site for incorporation of the cationic residue in the polymer. The cationic residue may be from about 10 mol % to about 50 mol %. This may include from about 10 mol % to about 40 mol %; about 10 mol % to about 35 mol %; about 10 mol % to about 30 mol %; about 15 mol % to about 50 mol %; about 15 mol % to about 40 mol %; about 15 mol % to about 35 mol %; or about 15 mol % to about 35 mol %. In some embodiments, the cationic residue may be from about 15 mol % to about 35 mol % of the polymer. In any of the above embodiments, each $R^7$ may be

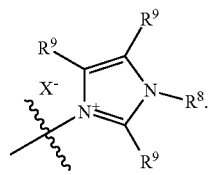

Alternatively, in any of the above embodiments, each $R^7$ may be

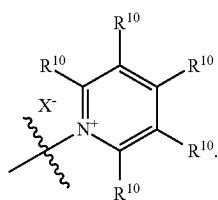

Alternatively, in any of the above embodiments, each $R^7$ may be —$R[N(R^{11})_3]^+$. Alternatively, in any of the above embodiments, each $R^7$ may be —$[P(R^{13})_3]^+$.

In any of the above embodiments, each $R^1$ may individually be a $C_1$-$C_6$ alkylene, $C_3$-$C_{16}$ cycloalkylene, or $C_3$-$C_{16}$ heterocycloalkylene; each $R^3$ may individually be $C_1$-$C_6$ alkyl, $C_3$-$C_{16}$ cycloalkyl, or $C_3$-$C_{16}$ heterocycloalkyl; each $R^4$ may individually be $C_1$-$C_6$ alkylene, $C_3$-$C_{16}$ cycloalkylene, or $C_3$-$C_{16}$ heterocycloalkylene; each $R^5$ may individually be absent or $C_1$-$C_6$ alkylene, $C_3$-$C_{16}$ cycloalkylene, or $C_3$-$C_{16}$ heterocycloalkylene; and each $X^-$ may individually be an anion. Illustrative examples of anions include, but are not limited to, $F^-$, $Cl^-$, $Br^-$, $I^-$, $BF_4^-$, $PF_6^-$, $SbF_6^-$, $AsF_6^-$, $ClO_4^-$, $N(CF_3SO_2)_2^-$, $C(CF_3SO_2)_3^-$, triflate ($SO_3CF_3$; trifluoromethansulfonate), $N(SO_2C_2F_5)^-$, $BAr_4^-$, and a mixture of any two or more such anions, wherein Ar is an aryl or fluorinated aryl or a bis(trifluoromethyl)aryl group.

In some embodiments of the above formulae, each Cat may be a cationic cyclic group, a cationic heterocyclyl group, a cationic aryl group, or a cationic heteroaryl group. Illustrative Cat groups include a pyridinium group that is attached to $R^3$ (or to the acetal group if $R^3$ is absent), at the 1 (i.e. the nitrogen position), 2, 3, 4, 5, or 6 position of the pyridinium ring, an imidazolium group that is attached to $R^3$ (or to the acetal group if $R^3$ is absent), at the 1, 2, 3, 4, or 5-position of the imidazolium ring, or a phenyl ring with a phosphonium or ammonium substituent. In some embodiments, the Cat group is a group of one of the following:

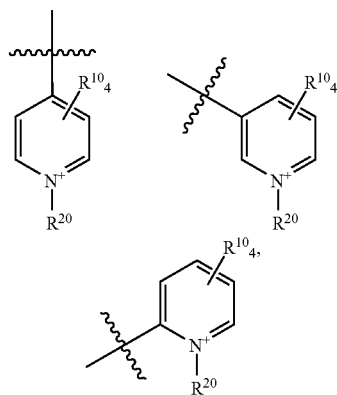

where $R^{20}$ is H, alkyl, cycloalkyl, or heterocycyl. In some embodiments, the Cat group is:

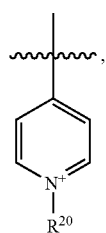

where $R^{20}$ is H, alkyl, cycloalkyl, or heterocycyl. In some embodiments, $R^3$ is absent and the Cat group is a group of one of the following:

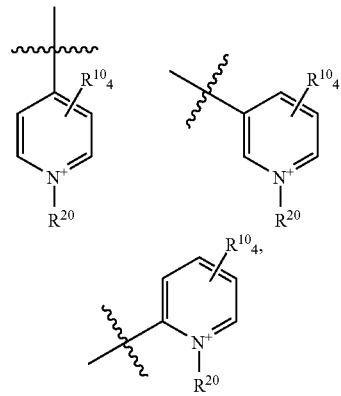

where $R^{20}$ is H, alkyl, cycloalkyl, or heterocycyl. In some embodiments, $R^3$ is absent the Cat group is:

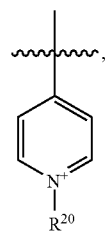

where $R^{20}$ is H, alkyl, cycloalkyl, or heterocycyl.

In any embodiments of the above formulae, $R^6$ may be —$CH_2$—. In any embodiments of the above formulae, $R^{3a}$ may be —$CH_2$—, —$CH_2CH_2$—, —$CH_2CH_2CH_2$—, —$CH_2CH_2CH_2CH_2$—, —$CH_2CH_2CH_2CH_2CH_2$—, or —$CH_2CH_2CH_2CH_2CH_2CH_2$—.

Illustrative cationic polymers according to Formulae I, II, and III, include, but are not limited to those of Formulae IA-D, IIA-D, and IIIA:

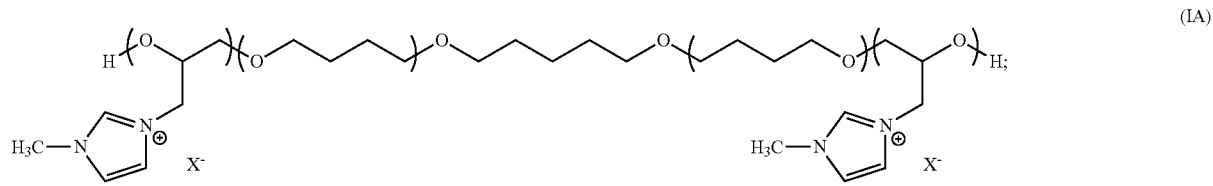

(IA)

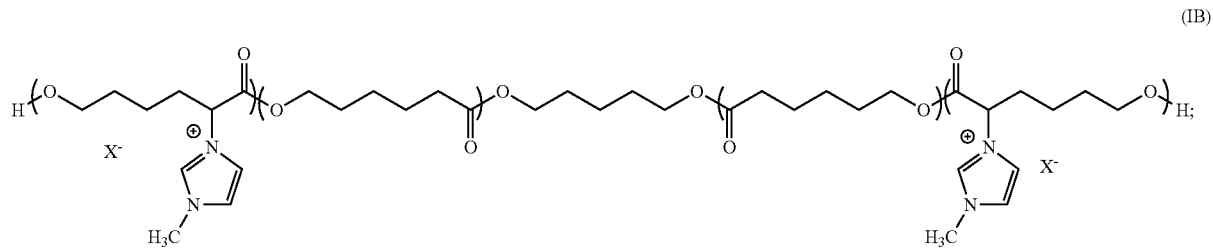

(IB)

(IC)
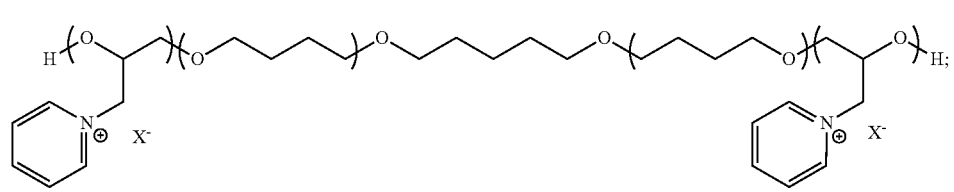
(ID)
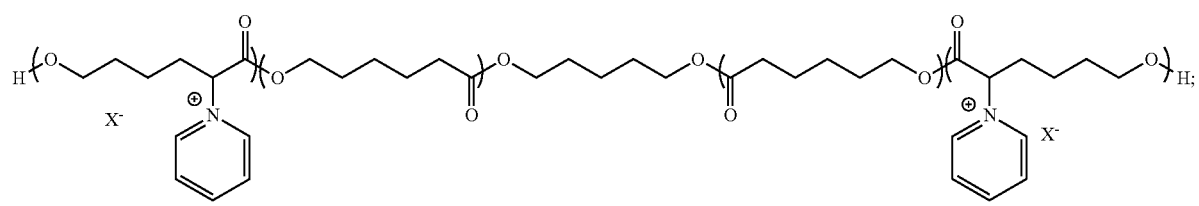
(IIA)
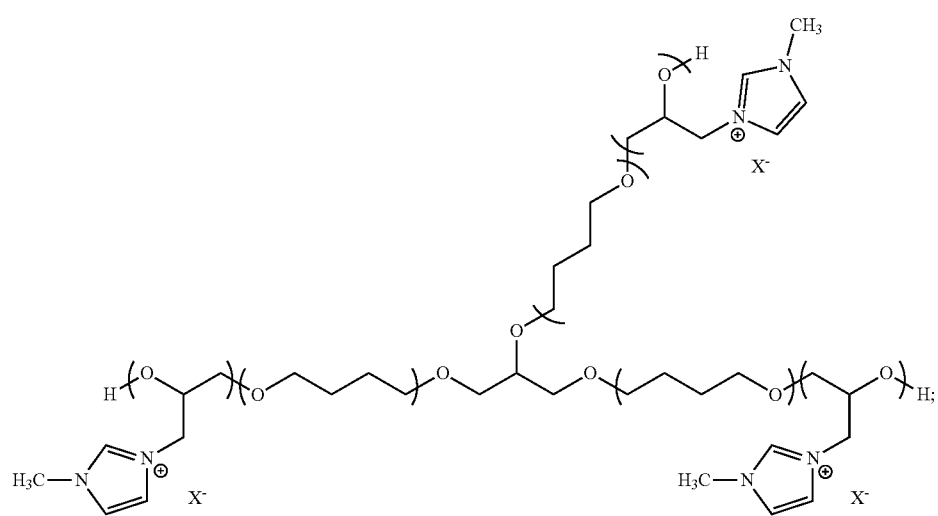
(IIB)
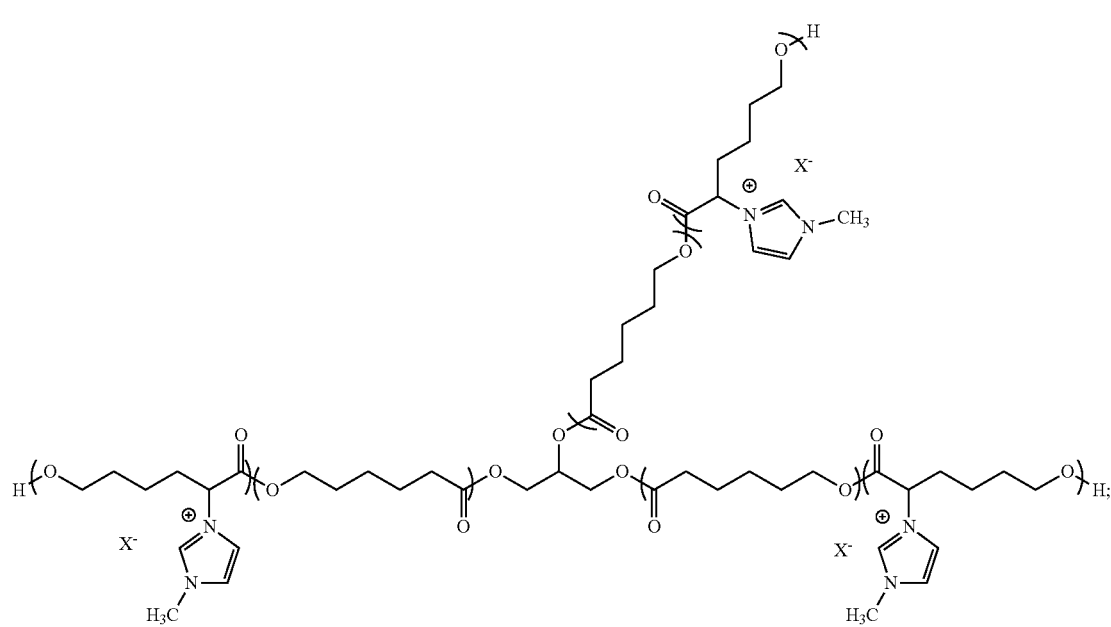

-continued

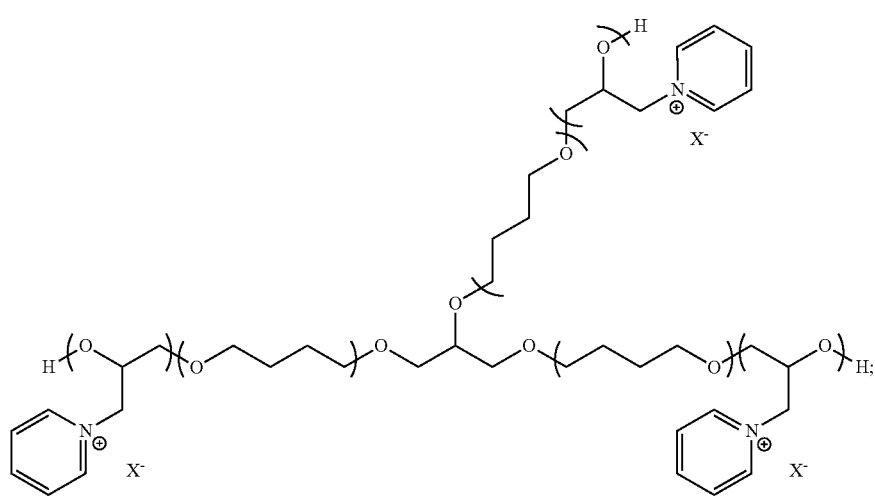

(IIC)

(IID)

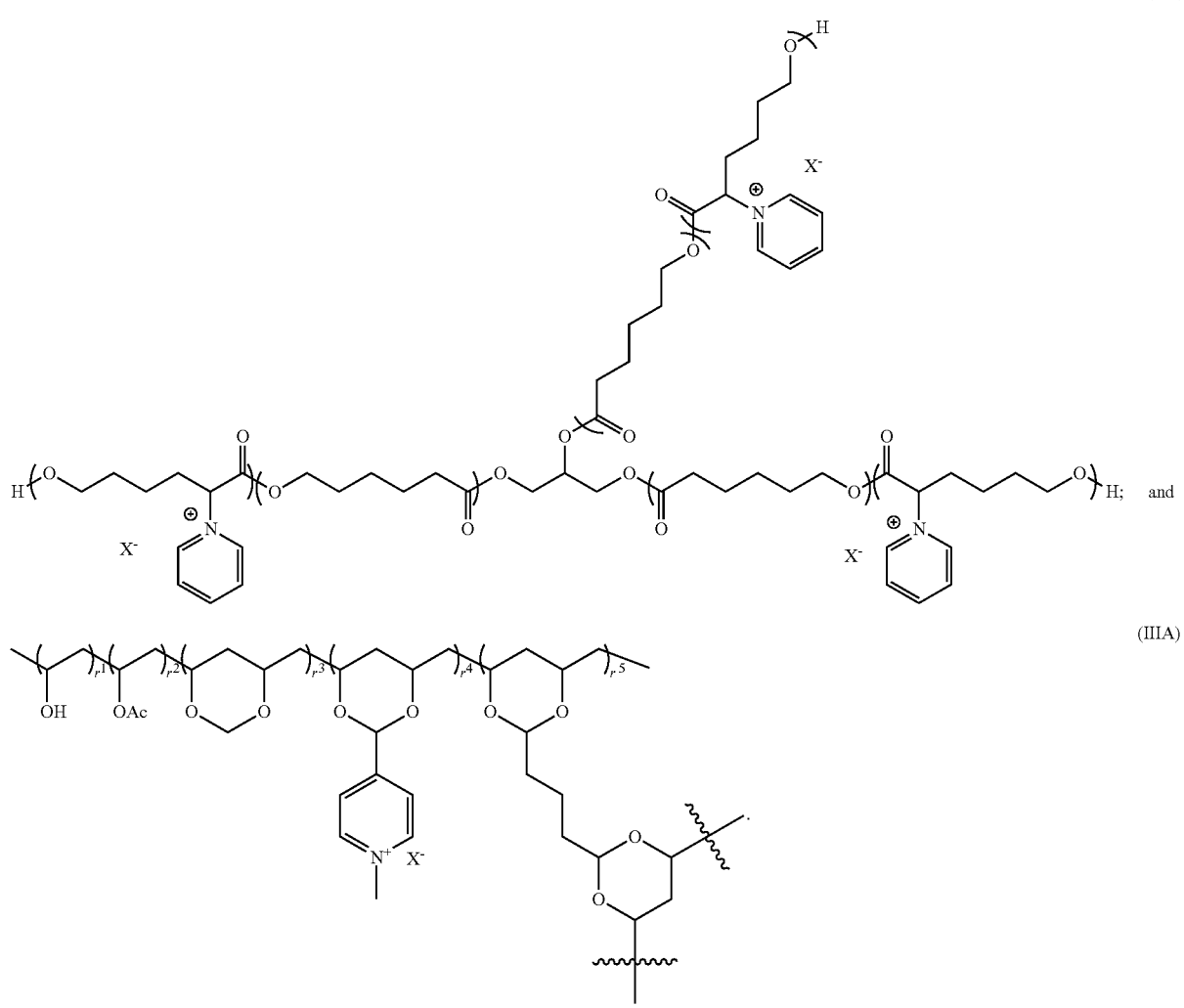

(IIIA)

In Formulae IA-D, IIA-D, and IIIA, and as above, the parentheses indicate repeat units of the polymer. To the extent specific values are required, they are stated above.

As noted above, the cationic polymers described herein may be further cross-linked with a cross-linking agent.

Illustrative cross-linking agents may include, but are not limited to di- or tri-isocyanates.

The cationic polymers described herein have molecular weights from about 1,000 to about 10,000 Daltons. This includes, but is not limited illustrative ranges such as from about 1,000 to about 8,000 Daltons; about 1,000 to about 7,000 Daltons; about 1,000 to about 6,000 Daltons; about 1,500 to about 8,000 Daltons; about 1,500 to about 6,000 Daltons; about 1,500 to about 5,500 Daltons; about 2,000 to about 10,000 Daltons; about 2,000 to about 6,000 Daltons; about 2,000 to about 5,000 Daltons; and about 3,000 to about 6,000 Daltons.

In another aspect, methods of preparing the transparent, ion-selective polymer membranes are provided. The methods include reacting the monomeric constituents of the polymers either neat or in a solvent such as propylene carbonate. Where a polyisocyanate is used with a diol or triol, such as for the preparation of some of the polymers described by Formulae I or II, an isocyanate:hydroxyl ratio may be from about 1.00 to about 1.10. Catalysts may be used in the reactions. For example, organotin catalysts may be used to effect the isocyanate/alcohol reaction in some embodiments. Once the polymers have been formed, they may be cast or drawn on a release liner (i.e. polyethylene terephthalate or polytetrafluoroethylene) and the solvent removed, or the polymer allowed to cure at either room, or elevated, temperature. A second release liner may be used over the polymer in a sandwich fashion, if desired.

The present invention, thus generally described, will be understood more readily by reference to the following examples, which are provided by way of illustration and are not intended to be limiting of the present invention.

EXAMPLES

Example 1. Preparation of Pyridinium-Substituted Poly(Vinyl Formal) Membrane

To a reaction vessel was added 4-formyl-N-methylpyridinium tosylate (0.448 g, 1.53 mmol), 10% (w/w) aqueous poly(vinyl alcohol) (6.00 g, 10.8 mmol OH), and deionized water (3.43 g), followed by 2-3 drops of conc. hydrochloric acid. The mixture was heated to 65° C. and stirred for 2 h, after which 37% (w/w) aqueous formaldehyde (0.223 g, 2.75 mmol) was added. Stirring was continued at 65° C. for an additional 2 h, then the mixture was allowed to cool to ambient temperature upon standing and treated with 50% (w/w) aqueous glutaraldehyde (0.184 g, 0.920 mmol). The mixture was stirred magnetically at ambient temperature for 15 seconds, then cast and drawn across a PET substrate with a doctor blade set to a 450 µm gap. The coating was allowed to stand at ambient temperature under laminar air flow for 22 hours, then heated in an oven at 80° C. for 30 minutes, cooled to ambient temperature, and then cut into 4.5 cm squares and separated from the PET substrate.

Example 2. Conditioning of Pyridinium-Substituted Poly(Vinyl Formal) Membrane (Example 1)

A 4.5 cm×4.5 cm section of ion-exchange membrane was soaked for 2 minutes in a glass dish containing 40% w/w aqueous sodium tetrafluoroborate and then soaked for 2 minutes in deionized water. The ion-exchange membrane was then soaked for 2 minutes in methanol and soaked for 10 minutes in a 0.500 M solution of tetraethylammonium tetrafluoroborate in propylene carbonate heated to 65° C. The membrane was then removed from the bath and flattened between a pair of PET release liners for later use.

Example 3. Synthesis of poly(ECH-co-THF) Diol

A mixture of tetrahydrofuran (THF; 108 g, 1.49 mol), 1,5-pentanediol (6.20 mL, 59.0 mmol), and $BF_3$—$OEt_2$ (1.35 mL, 11.0 mmol) were cooled to 0° C. while stirring under argon, then treated dropwise with epichlorohydrin ("ECH"; 50.0 mL mL, 0.630 mol) over 45 minutes. Stirring was continued for an additional 16 hours, after which solid $NaHCO_3$ (3.0 g) was added and stirring continued for an additional 20 minutes. The suspension was then suction-filtered, and the filtrate was concentrated under reduced pressure (14 Torr) at 60° C. The residue was then further dried in vacuo (50 mTorr) for an additional 20 h, affording a colorless, viscous oil (0.157 kg).

Example 4. Synthesis of poly(ECH-co-THF) Tetraol

A mixture of pentaerythritol ethoxylate (15.9 g, 59.0 mmol), tetrahydrofuran (121 mL, 1.49 mol), and $BF_3$—$OEt_2$ (1.35 mL, 11.0 mmol) was cooled to 0° C. while stirring under argon, then treated dropwise with epichlorohydrin (50.0 mL, 0.630 mol) added over 45 minutes. The mixture was allowed to warm to ambient temperature upon standing while stirring under Ar for an additional 22 hours, then diluted with dichloroethane (250 mL) and treated with $Ca(OH)_2$ (6.0 g). The resulting suspension was stirred for an additional 45 minutes and then suction filtered. The filtrate was concentrated under reduced pressure (14 Torr) at 60° C., then dried in vacuo (50 mTorr) for an additional 20 h, affording a colorless, viscous liquid (0.150 kg).

Example 5. Synthesis of (THF-co-pyridiniumpropylene Oxide ("PyPO")) Diol

A mixture of poly(tetrahydrofuran-co-epichlorohydrin) diol (35.5 g) and pyridine (40.5 g, 512 mmol) was heated to 100° C. and stirred under argon for 20 hours. The resulting slurry was allowed to cool to 65° C. upon standing and then concentrated under reduced pressure (14 Torr). The residue, upon cooling to ambient temperature, was dissolved in deionized water (125 mL) and added dropwise to a stirred 40% w/w solution of sodium tetrafluoroborate (NaBF4) in water (350 mL), during which a tan semi-solid precipitated. The supernatant was decanted, and the precipitate washed several times with deionized water (3×75 mL), then resuspended portionwise in dichloroethane (3×100 mL) and suction-filtered. The filtrate was then concentrated under reduced pressure (14 Torr) at 60° C. and the residue further dried in vacuo (50 mTorr), affording a viscous amber oil (31.2 g).

Example 6. Synthesis of (THF-co-PyPO) Tetraol

A mixture of poly(tetrahydrofuran-co-epichlorohydrin) diol (50.0 g) and pyridine (50.0 g, 632 mmol) was heated to 100° C. and stirred under argon for 20 h. The resulting slurry was allowed to cool to 65° C. upon standing and then concentrated under reduced pressure (14 Torr). The residue, upon cooling to ambient temperature, was dissolved in deionized water (200 mL) and added dropwise to a stirred 40% w/w solution of $NaBF_4$ in water (500 mL), during which a tan semi-solid precipitated. The supernatant was decanted, and the precipitate washed several times with deionized water (3×125 mL), then dissolved in dichloroethane (3×200 mL) and suction-filtered. The filtrate was then concentrated under reduced pressure (14 Torr) at 60° C. and the residue further dried in vacuo (50 mTorr), affording a viscous amber oil (41.0 g).

Example 7. Synthesis of poly(THF-co-GTMA) Tetraol

A mixture of pentaerythritol ethoxylate (1.86 g, 6.88 mmol), tetrahydrofuran (14.0 mL, 172 mmol), and $BF_3$-THF (145 μL, 1.31 mmol) was cooled to 0° C. while stirring under argon and then treated dropwise with glycidyltrimethylammonium ("GTMA") bistriflimide (30.0 g, 75.7 mmol) added over 45 minutes. The mixture was allowed to warm to ambient temperature and stirred under Ar for an additional 22 hours, then diluted with dichloroethane (25 mL) and treated with sodium carbonate (6.0 g). The resulting suspension was stirred for an additional 45 minutes, then suction-filtered. The filtrate was concentrated under reduced pressure (14 Torr) at 60° C., then dried in vacuo (50 mTorr) for an additional 22 h, affording a colorless, viscous liquid (35.0 g).

Example 8. Curing of Poly(THF-Co-PyPO) Tetraol with Hexamethylenediisocyanate Trimer ("HDT")

A 85% w/w polyol stock solution was prepared by dissolving poly(THF-co-PyPO) (18.0 g) in propylene carbonate (3.18 g), and an isocyanate/catalyst stock solution was prepared by mixing HDT (5.65 g) and propylene carbonate (1.00 g) with 10.0% w/w $Bu_2Sn(OAc)_2$ in propylene carbonate (0.237 g). To each of a series of nine reaction vessels was added the polyol stock solution (2.35 g) and varying quantities of the isocyanate/catalyst stock solution in order to afford NCO:OH ratios from approx. 0.80 to 1.20 in increments of 0.05 (based on an estimated polyol molecular weight of 2,144 Da). The contents of each vial were vigorously stirred with a wooden applicator rod and then allowed to stand at ambient temperature for 18 h. All nine formulations cured to transparent, light amber monoliths.

Example 9. Build an Electrochromic Device with Pyridinium-Substituted Poly(Vinyl Formal) Membrane Anodic gel: to a 20 mL scintillation vial were added tetraethylammonium tetrafluoroborate ($Et_4NBF_4$)(0.109 g, 0.502 mmol), glass spacer beads (250 m, 0.300 g), and propylene carbonate (5.53 g). The mixture was gently agitated until the $Et_4NBF_4$ dissolved and was then purged with argon for 20 minutes. To the mixture was then added bis(triethylaminopropyl)dihydrophenazine bis(tetrafluoroborate) (0.080 g, 0.125 mmol) and the mixture was agitated to promote dissolution of the newly added compound. To the mixture was then added fumed silica (0.360 g), under argon purge, and the slurry was vigorously stirred with a wooden applicator. The vessel was flushed with argon and then capped.

Cathodic gel: to a 20 mL scintillation vial were added $Et_4NBF_4$ (0.109 g, 0.502 mmol), glass spacer beads (250 m, 0.300 g), and propylene carbonate (5.53 g). The mixture was gently agitated until the $Et_4NBF_4$ had dissolved and it was then purged with a stream of argon for 20 minutes. To the mixture was then added dioctylviologen bis(tetrafluoroborate) (0.070 g, 0.125 mmol) and the mixture agitated under argon purge to promote dissolution of the newly added compound. To the mixture was then added fumed silica (0.360 g), and the slurry was vigorously stirred with a wooden applicator. The vessel was flushed with argon and then capped.

Spacer paste: to a 20 mL scintillation vial were added glass spacer beads (600 m, 0.630 g), propylene carbonate (5.34 g), and fumed silica (0.400 g), and the slurry was vigorously stirred with a wooden applicator.

In an $N_2$-purged enclosure and under a positive $N_2$ pressure, a "splat" cell was constructed using indium tin oxide ("ITO") coated 3×3 inch glass squares. Onto each of the four corners of the ITO-coated side of one piece of glass was evenly deposited a dot of spacer paste. Near the center of the glass square, on the ITO coated side, was then deposited a portion of the anodic gel. A strip of conditioned cationic acetal membrane from Example 2 was gently flattened between the dots of spacer paste and pressed against the deposited anodic gel. A portion of cathodic gel was then applied on top of the membrane and aligned with the anodic gel layer. The second piece of ITO-coated glass was placed atop the stacked assembly with the ITO coating in contact with the anodic gel. The two pieces of glass were held together, electrical contacts were made with each ITO coating independently through the use of bus clips and connector wires, and the whole device was placed in an enclosure and purged with Ar for 1 hour.

Through the connector wires, the "splat" cell device was powered at 1.0 V in a reverse bias configuration for 1 minute, during which time the device remained colorless. The device was then powered at 1.0 V with forward bias for 10 seconds, and the device became dark where the anodic, cathodic and membrane stack resided. After 10 seconds, no further darkening was observed. The device was then left in an open-circuit configuration and observed at multiple intervals (e.g. 15 min, 30 min, 1 h, 2 h, 3 h, and 4 h after darkening). During this 4 hour period, no fading of the device was observed.

The cationic, vinyl acetal membrane investigated led to excellent dynamic range, kinetics, and color-retention in a 3-layer electrochromic device constructed from separated cathodic and anodic chromophore gels.

Example 10

The general description of the construction of an electrochromic device with a transparent ion exchange membrane (Example 2) embedded into the edges of a thermally cured epoxy perimeter seal, as shown in FIG. 2. With this device construction, glass gaskets on each side of the membrane were used to set the distance from each ITO coated glass substrate, creating the two electrochromic chambers, anodic and cathodic, with the transparent ion-selective membrane sandwiched between them. The gaps in each gasket allowed for the placement of small glass capillaries that functioned as ports for vacuum evacuation of the device and subsequent backfilling with electrochromic fluid.

Stepwise construction of the device is as follows: 1) the pre-cut glass gasket and two glass capillaries were arranged on a release liner in a lay-up jig; 2) the epoxy was dispensed around the capillaries and at the perimeter of the desired membrane location; 3) a glass filler plug was positioned inside the gasket to provide a continuous flat surface, and then a membrane was aligned with the epoxy and pressed flat; 4) epoxy was dispensed on top of the membrane and aligned with the epoxy below it; 5) the second gasket was positioned and capillary tubes were embedded as in steps 1-2 and then the epoxy pressed flat; 6) epoxy was dispensed in the same pattern on the second gasket and capillary tubes, and then an outer plate was placed over the epoxy and pressed flat; 7) epoxy seals were allowed to cure at ambient temperature overnight; 8) the assembly was removed from the jig, inverted, and replaced in the jig and the glass filler plug removed; 9) epoxy was dispensed matching the prior locations, and then the second outer plate was positioned on the epoxy and pressed flat; 10) the epoxy was allowed to cure overnight at ambient temperature. The device was then ready to be backfilled with fluid.

An electrochromic solution was made by dissolving a cathodic material, 5.7 millimolar bis(octyl)viologen bis(tetrafluoroborate) and an anodic material, 4.05 millimolar bis(triethylaminopropyl)dihydrophenazine bis(tetrafluoroborate) with 0.5 millimolar decamethyl ferrocenium tetrafluoroborate; 0.5 millimolar decamethylferrocene, 0.10 molar tetraethylammonium tetrafluoroborate, 2.8% by weight of a copolymer of 2-hydroxyethylmethacrylate and methylacrylate (mole ratio of momomers in polymer at 1/10, respectively), 0.19% by weight methylene diphenyl diisocyanate, and 1.0 ppm of dibutyltin diacetate in a solvent, propylene carbonate. This electrochoromic solution was vacuum-filled into chambers on both sides of the membrane, and the device was plugged with a UV-curable epoxy.

After allowing the electrochromic fluid to gel, a power supply was connected to the two ITO electrodes and the device was powered at 1.2 volts. The electrochromic device darkened quickly (20-30 s), then the device was held at open circuit. In open circuit, the electrochromic device retained color for greater than 24 hours. The devices cleared within approx. 30-45 s by placing a short across the two ITO electrodes.

Example 11. Membrane Electrochromic Device on a Transparent Conductor/PET Substrates Using Conditioned Membrane from Example #2

Materials: cathodic based gel, anodic based gel, conditioned membrane from example #2, and the substrates are a TCO/PET (polyethylene terephthalate) or a TCO coated on IMI (inorganic-metallic-inorganic conductive stack (7 ohms per square) on PET.

| Component | Mw | Conc. | Mass | Percentage |
|---|---|---|---|---|
| Cathodic Layer | | | | |
| Octylviologen bis(tetrafluoroborate) | 556.2 g/mol | 32 mM | 0.890 g | 1.63% |
| Decamethyl ferrocenium tetrafluoroborate | 413.1 g/mol | 0.5 mM | 0.010 g | 0.02% |
| 22% Copolymer in PC* | | 19.6% | 53.45455 g | 98.00% |
| Propylene carbonate (PC) | | | 0.191 g | 0.35% |
| Dibutyltin diacetate (1% solution in PC) | | 10 ppm | 50.42017 μL | 54.545 |
| Methylene diphenyl diisocyanate (MDI) | | 0.28% | 0.168 g | 3.08% |
| PC | | | 5.286545 g | |
| | | | 60.000 g | |
| Anodic Layer | | | | |
| 5,10-dihydro-5,10-dimethylphenazine | 210.3 g/mol | 27 mM | 0.284 g | 0.52% |
| Decamethyl ferrocene | 326.3 g/mol | 0.5 mM | 0.008 g | 0.01% |
| 22% Copolymer in PC* | | 19.6% | 53.45455 g | 98.00% |
| PC | | | 0.799 g | 1.46% |
| Dibutyltin diacetate (1% solution in PC) | | 10 ppm | 50.42017 μL | 54.545 |
| MDI | | 0.28% | 0.168 g | 3.08% |
| PC | | | 5.286545 g | |
| | | | 60.000 g | |

*Note:
the copolymer in this experiment is a 1 to 10 molar ratio of 2-hydroxyethylmethacrylate and methyl acrylate, respectively, randomly polymerized.

Device Construction and Assembly: Multilayer device consisting of (general stackup): PET/TCO/Cathodic Gel/Ion Exchange Membrane/Anodic Gel/transparent conductor/PET. As used herein, PET is an abbreviation for polyethyleneterephthalate, and TCO is a transparent conductive oxide. Cathodic and anodic gel drawdown coatings were made on separate pieces of IMI (inorganic-metallic-inorganic silver stack (7 ohms per square) on PET using a doctor blade with a 200 micron gap (other stacks of layers that were employed include PET/inorganic-metallic-inorganic layer/TCO). The coatings were allowed to gel overnight at ambient temperature in a nitrogen box, after which the thickness of each gel coating was 100 microns.

A conditioned ion exchange membrane (Example 2) was flattened atop the cathodic layer, and the anodic layer was then flattened atop the membrane. Pressure was applied with a roller to ensure good contact between the layers. Bus bars were affixed to the transparent conducting films (in some instances, devices prepared in this manner were placed between matching sheets of glass using a liquid, optically clear adhesive and a barrier sealant around the edge). Device transmission and current were measured while applying a potential of 1.2 V for 3 min, while holding the device in an open circuit configuration, and then shorting the device for 3 min.

The device remained in the darkened state overnight (20 hours) while in an open circuit configuration. The device cleared within 3 minutes upon applying 1.2 V in reverse bias.

Example 12

Comparison of no membrane, SpectraPor X, and Nafion 115-$Li^+$.

Preparation of Nafion 115-$Li^+$ membrane. A 10 cm×10 cm piece of Nafion 115 was soaked in 250 mL 3% $H_2O_2$ at 80° C. for two hours. The membrane was rinsed with water then soaked in 250 mL 0.1% HCl at 80° C. for one hour then cooled to room temperature overnight. The membrane was then rinsed with water then soaked in 500 mL 2M LiOH at 80° C. for two hours. The membrane was rinsed with water then soaked in 300 mL water and deoxygenated with bubbling argon for 16 hours.

Preparation of Spectra/Por 1 membrane. A section of Spectrum Laboratories Spectra/Por 1 (MWCO: 6-8000, 50 mm flat width) size exclusion membrane of 10 cm length was cut lengthwise to create a sheet of 10 cm×10 cm. The membrane was soaked in 300 mL water that was changed twice over an hour of soaking. The membrane was then soaked in 300 mL water and deoxygenated with bubbling argon for 16 hours.

Preparation of Electrolyte. A 50 mL vial was charged with 20.0 mL water that was then bubbled with argon for 30 minutes. 1,1'-bis(propyl-3-sulfonate)viologen (86 mg, 0.20 mmol), 5,10-bis(4-butanoate)phenazine bis(tetraethylammonium) (128 mg, 0.20 mmol), and lithium triflate (312 mg, 2.0 mmol) were added. The electrolyte was deoxygenated with argon for another 60 minutes.

Preparation and Operation of EC elements. The elements were assembled in a box purged with argon to limit exposure of the electrolyte to oxygen. Each element consisted of two 7.5 cm×7.5 cm glass electrodes each coated with half wave ITO and facing each other. The electrodes were separated by two layers of 254 μM thick skived PTFE tape for a total cell spacing of 508 μM. In the elements containing a membrane, the membrane was placed between the two layers of spacer tape. The compartment(s) were filled with the electrolyte.

The elements were then powered at 1.2V. After the three elements were fully colored, the potential was removed and the elements left at open circuit. The reference element with no membrane cleared within 7 minutes. The element with the Spectra/Por size exclusion membrane cleared after 2 hours. The element with Nafion-Li+ was still colored after >3 hours but had cleared overnight.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A cationic polymer represented by Formula I, Formula II, or Formula III:

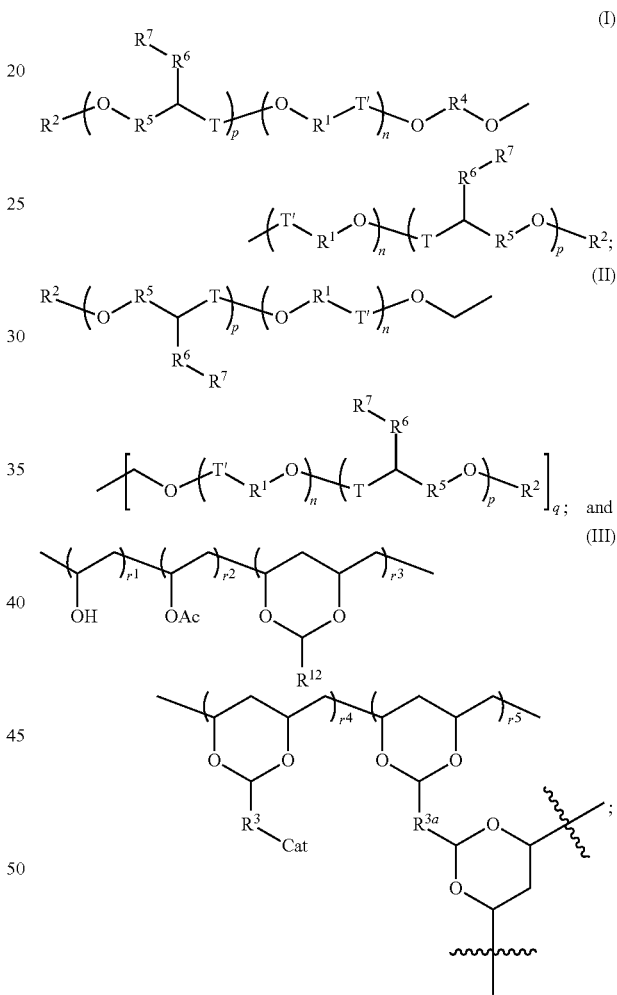

wherein:
  each $R^1$ may be individually alkylene, cycloalkylene, or heterocycloalkylene;
  $R^2$ may be H;
  each $R^3$ may be individually absent, —O—, or -alkyl-;
  each $R^{3a}$ may may be individually -alkyl-;
  each $R^4$ may be individually alkylene, cycloalkylene, or heterocycloalkylene;
  each $R^5$ may be individually absent or alkylene, cycloalkylene, or heterocycloalkylene;
  each $R^6$ may be individually absent or alkylene;

each R⁷ may be individually a group of formula:

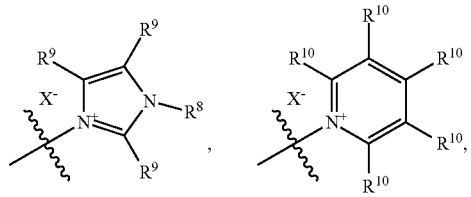

—[P(R¹³)3]+; or —[N(R¹¹)3]+;
R⁸ is alkyl, cycloalkyl, or heterocycloalkyl;
each R⁹ is individually H, F, Br, Cl, NO2, alkyl, cycloalkyl, alkoxy, aryl, or heteroaryl, or any two individual R⁹ groups may join together to form a ring which may be saturated or unsaturated;
each R¹⁰ is individually H, F, Br, Cl, NO2, alkyl, cycloalkyl, alkoxy, aryl, or heteroaryl, or any two individual R¹⁰ groups may join together to form a ring which may be saturated or unsaturated;
each R¹¹ is individually H, alkyl, cycloalkyl, aryl, or heteroaryl, or any two individual R¹¹ groups may join together to form a ring which may be saturated or unsaturated;
each R¹² may be individually H or alkyl;
each R¹² may be individually alkyl or aryl;
each Cat is a cationic group;
each X⁻is individually an anion;
each n, p, and r¹⁻⁵ indicate a repeat unit of the polymer;
each q may be individually 1, 2, or 3;
individually T is individually absent, C(O), or CH₂; and
individually T' is individually absent or C(O).

2. The cationic polymer of claim 1, wherein:
each R¹ is individually C₁-C₆ alkylene, C₃-C₁₆ cycloalkylene, or C₃-C₁₆ heterocycloalkylene;
R² is H;
each R³ is individually C₁-C₆ alkyl, C₃-C₁₆ cycloalkyl, or C₃-C₁₆ heterocycloalkyl;
each R⁴ is individually C₁-C₆ alkylene, C₃-C₁₆ cycloalkylene, or C₃-C₁₆ heterocycloalkylene;
each R⁵ is individually absent, C₁-C₆ alkylene, C₃-C₁₆ cycloalkylene, or C₃-C₁₆ heterocycloalkylene;
each X⁻is individually an anion; and
q is 2.

3. The cationic polymer of claim 1, wherein the anion comprises F⁻, Cl⁻, Br⁻, I⁻, BF₄⁻, PF₆⁻, SbF₆⁻, AsF₆⁻, ClO₄⁻, SO₃CF₃⁻, N(CF₃SO₂)₂⁻, C(CF₃SO₂)₃⁻, triflate (trifluoromethansulfonate), N(SO₂C₂F₅)⁻, or BAr₄⁻, wherein Ar is an aryl or fluorinated aryl or a bis(trifluoromethyl)aryl group.

4. The cationic polymer of claim 1, wherein n is from 10 to 100, p is from 2 to 50, and r¹⁻⁵ are each individually from 25 to 5,000.

5. The cationic polymer of claim 1, wherein R⁷ is

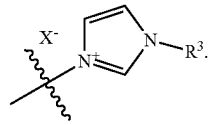

6. The cationic polymer of claim 1, wherein R⁷ is

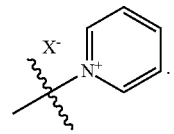

7. The cationic polymer of claim 1, wherein "Cat" is a group of one of the following:

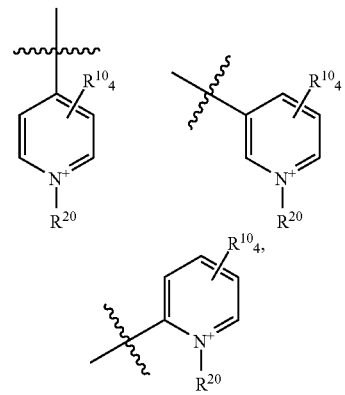

where R²⁰ is H, alkyl, cycloalkyl, or heterocycyl.

8. The cationic polymer of claim 1 represented by one or more of Formulas IA-D or Formulas IIA-D:

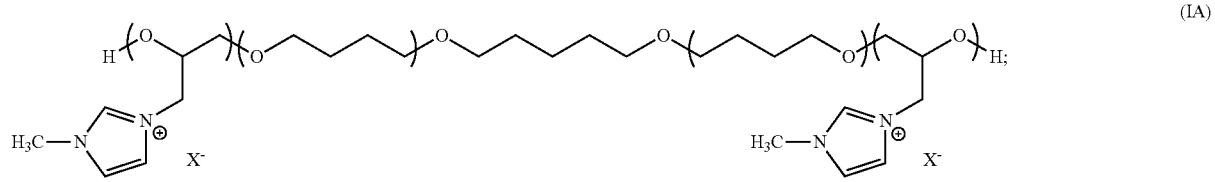

(IA)

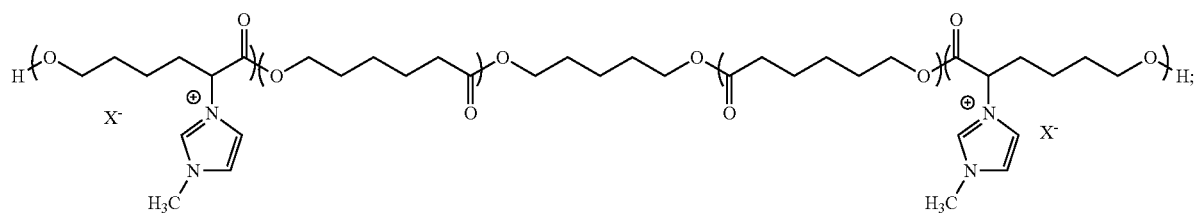

(IB)

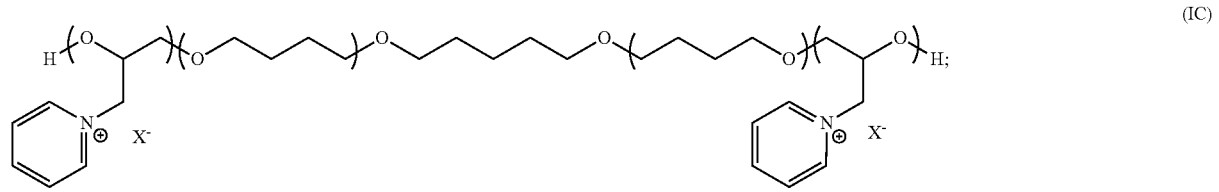
(IC)
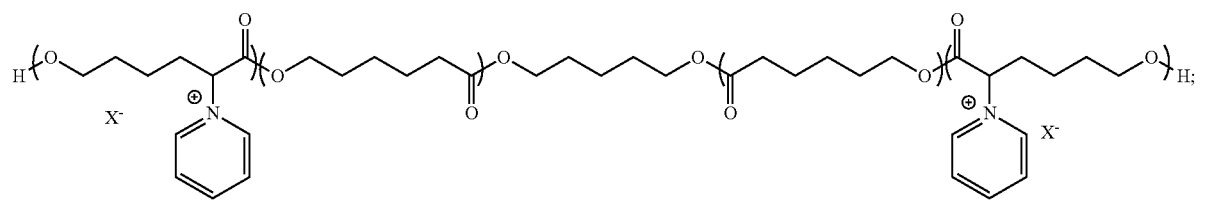
(ID)
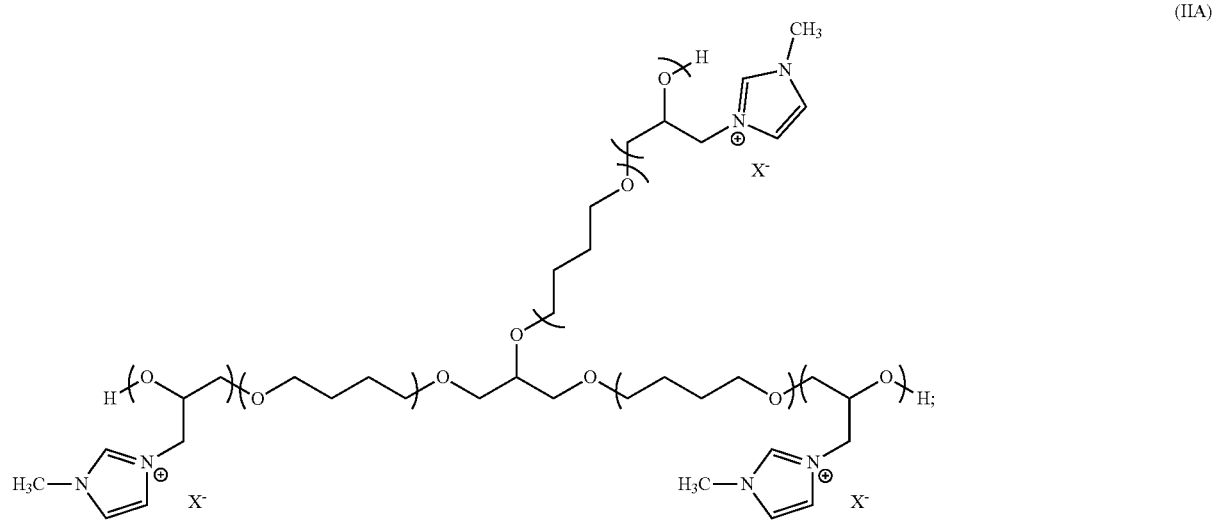
(IIA)
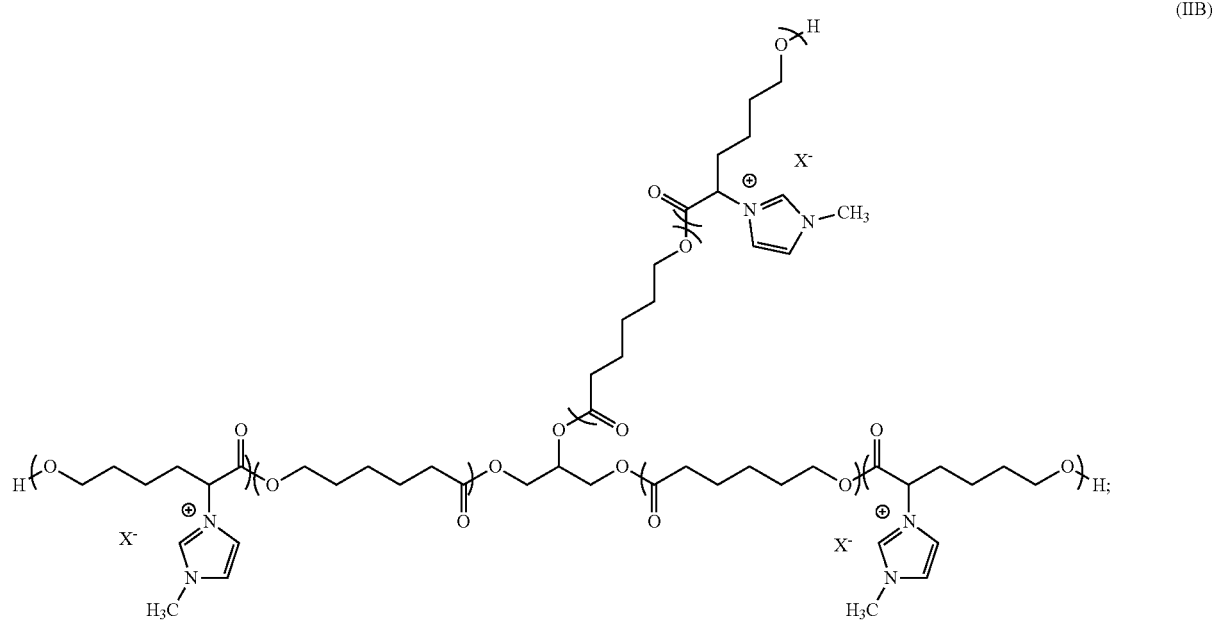
(IIB)

-continued
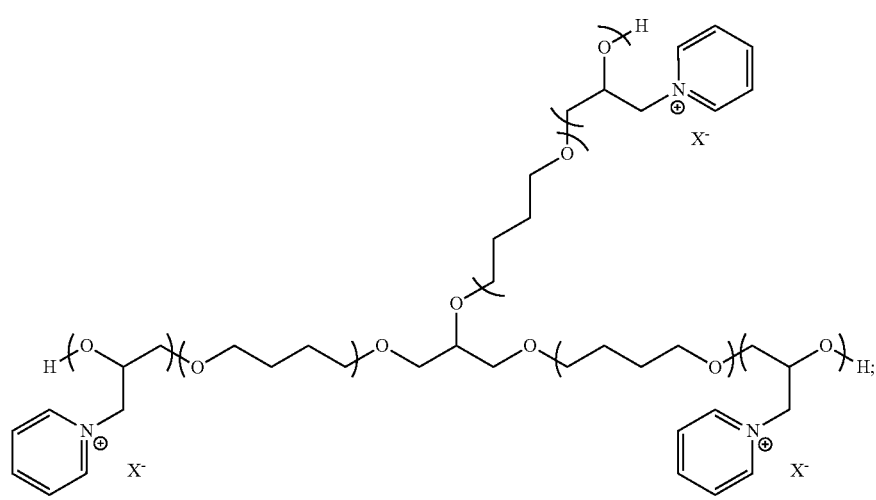
(IIC)
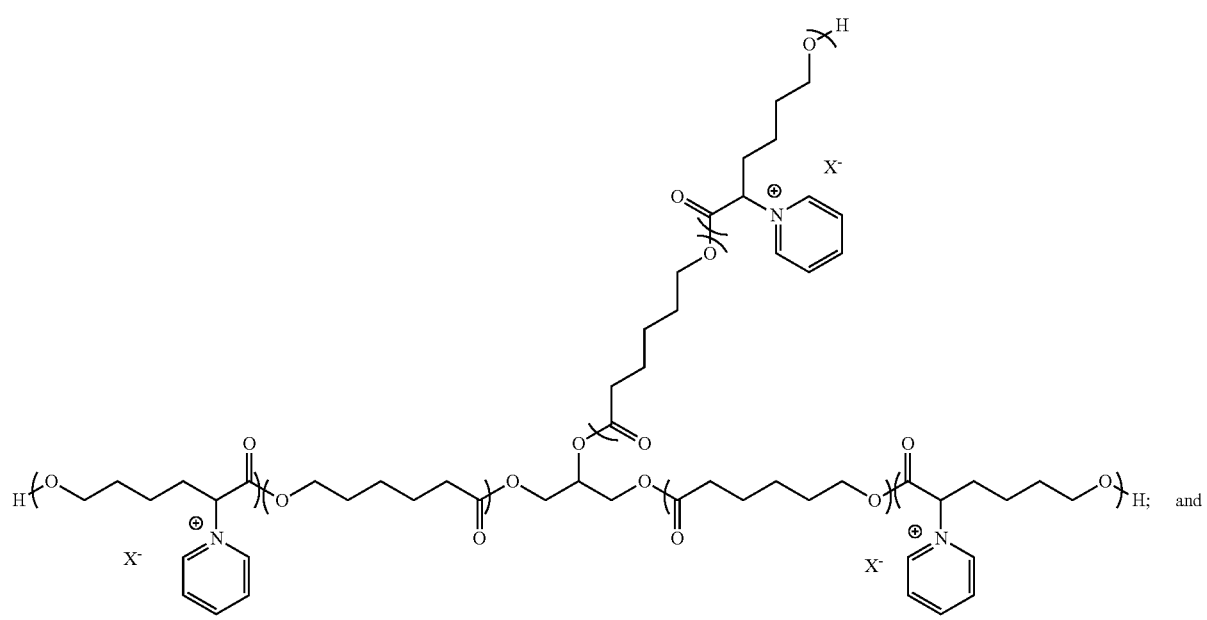
(IID)
and
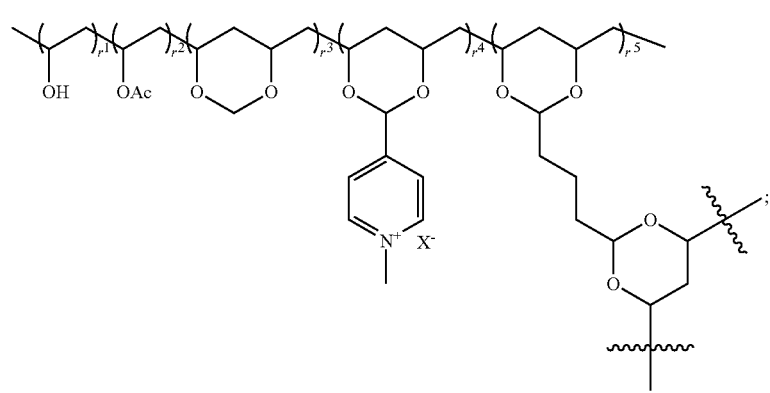
(III)

wherein the parentheses in each of Formulas IA-D and IIA-D indicate repeat units of values n, p, and r$^{1-5}$.

9. The cationic polymer of claim 1 which is cross-linked with a cross-linking agent.

a transparent, ion-selective membrane displaced between the cathodic compartment and the anodic compartment;

wherein: the transparent, ion-selective membrane comprises a cationic polymer represented by Formula I, Formula II, or Formula III:

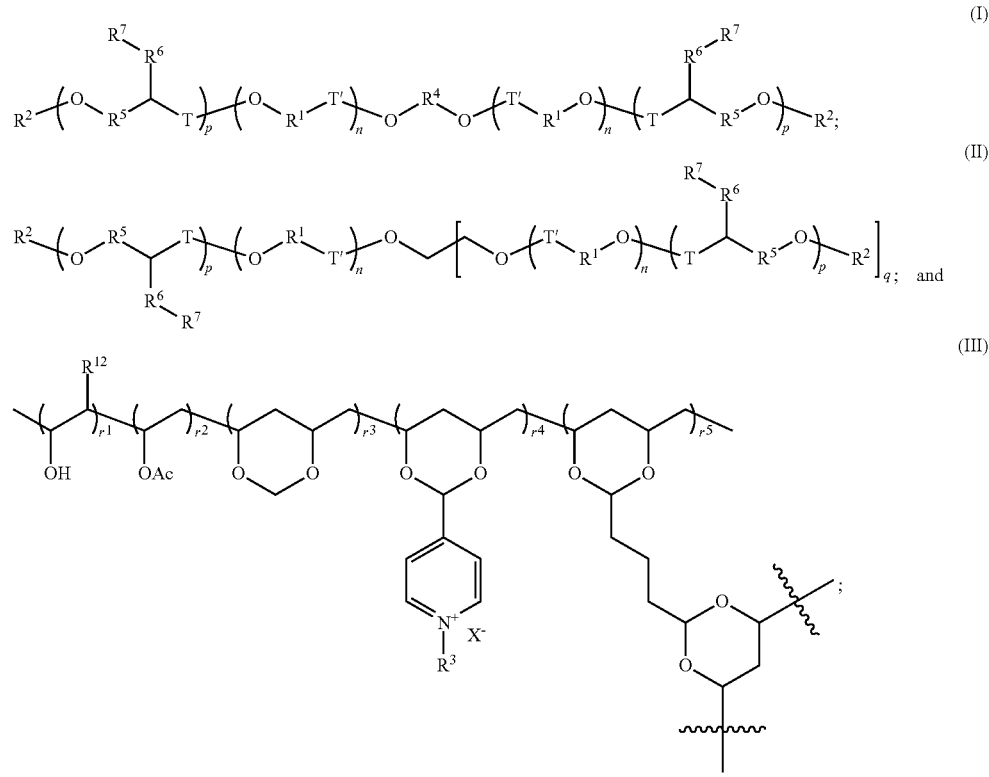

10. The cationic polymer of claim 9, wherein the cross-linking agent is a di-isocyanate, a tri-isocyanate, a polyisocyanate, or a dialdehyde.

11. An electrochromic device comprising:
a cathodic compartment comprising a viologen;
an anodic compartment comprising a metallocene, a 5,10-dihydrophenazine, a phenothiazine, a phenoxazine, a carbazole, a triphendioxazine, or a triphenodithiazine; and
a transparent, ion-selective membrane displaced between the cathodic compartment and the anodic compartment;
wherein:
the transparent, ion-selective membrane comprises the cationic polymer of claim 1.

12. The electrochromic device of claim 11, wherein the transparent, ion-selective membrane comprises an anionic or cationic polymer;
wherein:
when the ion-selective membrane comprises an anionic polymer, one or both the cathodic and the anodic materials are anions in the activated state; or
when the ion-selective membrane comprises an cationic polymer, one or both the cathodic and the anodic materials are cations in the activated state.

13. A electrochromic device comprising:
a cathodic compartment comprising a cathodic material;
an anodic compartment comprising an anodic material; and wherein:
each $R^1$ is individually alkylene, cycloalkylene, or heterocycloalkylene;
$R^2$ is H;
each $R^3$ is individually alkyl, cycloalkyl, or heterocycloalkyl;
each $R^4$ is individually alkylene, cycloalkylene, or heterocycloalkylene;
each $R^5$ is individually absent, alkylene, cycloalkylene, or heterocycloalkylene;
each $R^6$ is individually absent or $CH_2$;
each $R^{12}$ is H;
each $R^7$ is individually a group of formula

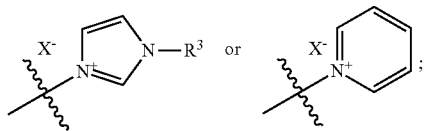

each X$^-$ is individually an anion;
each n, p, and r$^{1-5}$ indicate a repeat unit of the polymer;
each q may be individually 1, 2, or 3;
individually T is individually absent, C(O), or $CH_2$; and
individually T' is individually absent or C(O).

14. The electrochromic device of claim 13, wherein:
each $R^1$ is individually $C_1$-$C_6$ alkylene, $C_3$-$C_{16}$ cycloalkylene, or $C_3$-$C_{16}$ heterocycloalkylene;

R² is H;
each R³ is individually $C_1$-$C_6$ alkyl, $C_3$-$C_{16}$ cycloalkyl, or $C_3$-$C_{16}$ heterocycloalkyl;
each R⁴ is individually $C_1$-$C_6$ alkylene, $C_3$-$C_{16}$ cycloalkylene, or $C_3$-$C_{16}$ heterocycloalkylene;
each R⁵ is individually absent or $C_1$-$C_6$ alkylene, $C_3$-$C_{16}$ cycloalkylene, or $C_3$-$C_{16}$ heterocycloalkylene;
each X⁻ is individually an anion; and
q is 2.

15. The electrochromic device of claim 13, wherein anion comprises $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CF_3SO_2)_2^-$, $C(CF_3SO_2)_3^-$, triflate (trifluoromethansulfonate), $N(SO_2C_2F_5)^-$, or $BAr_4^-$, wherein Ar is an aryl or fluorinated aryl or a bis(trifluoromethyl)aryl group.

16. The electrochromic device of claim 13, wherein n is from 10 to 100, p is from 2 to 50, and $r^{1-5}$ are each individually from 25 to 5,000.

17. The electrochromic device of claim 13, wherein the cationic polymer is represented by one or more of Formulas IA-D or Formulas IIA-D:

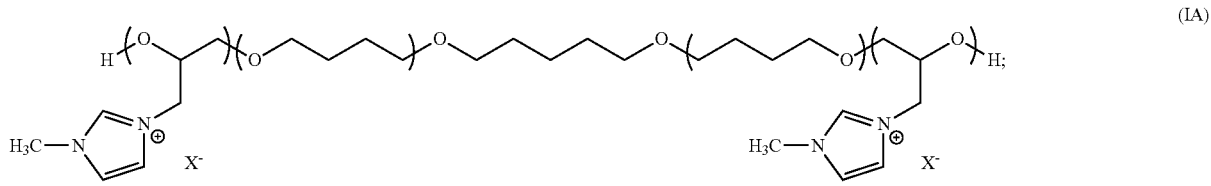

(IA)

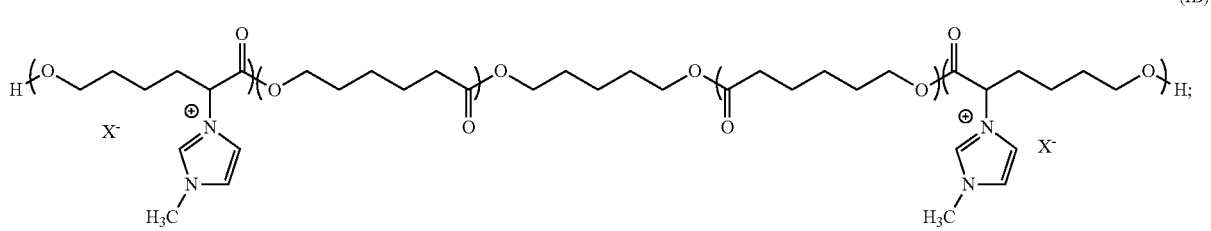

(IB)

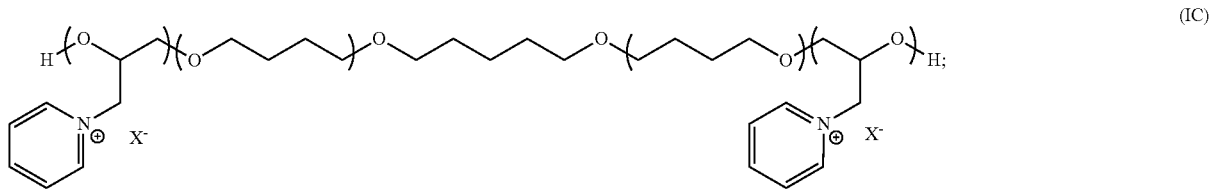

(IC)

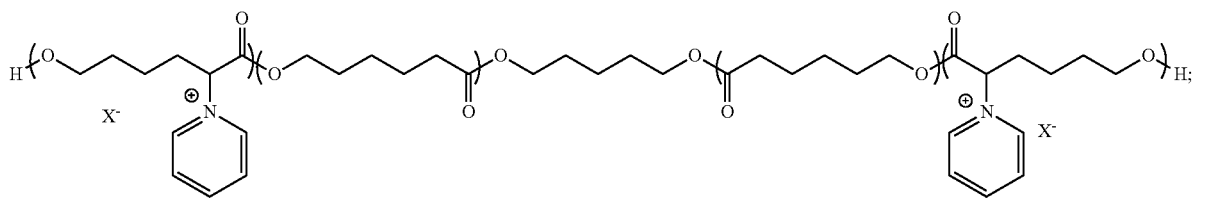

(ID)

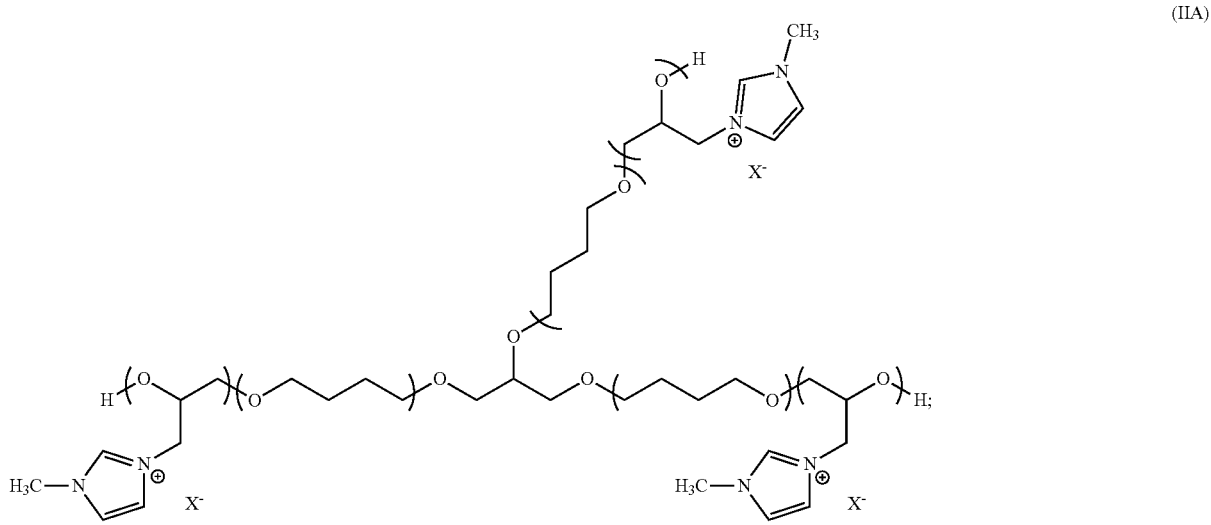

(IIA)

-continued
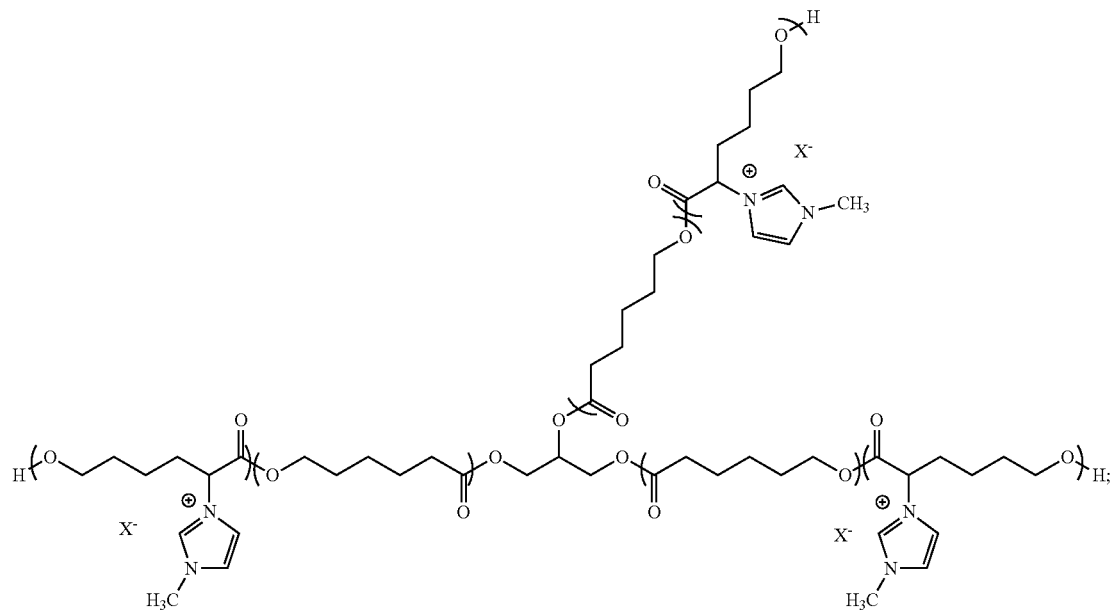
(IIB)
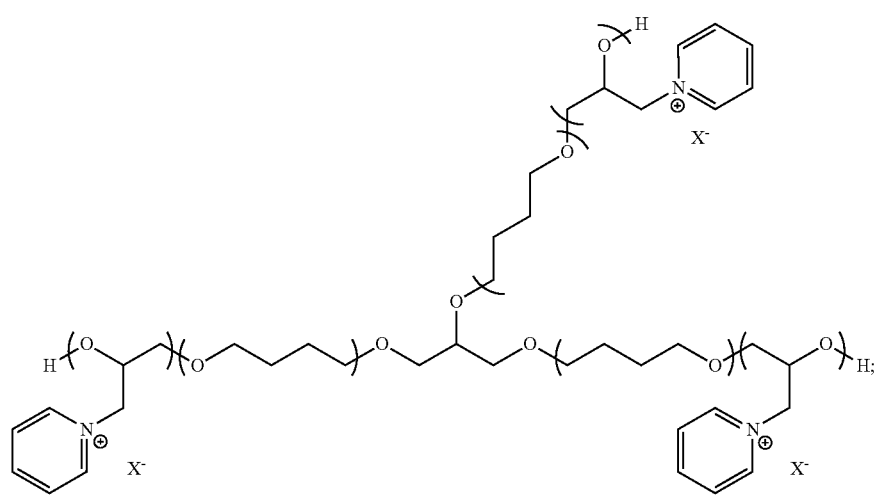
(IIC)

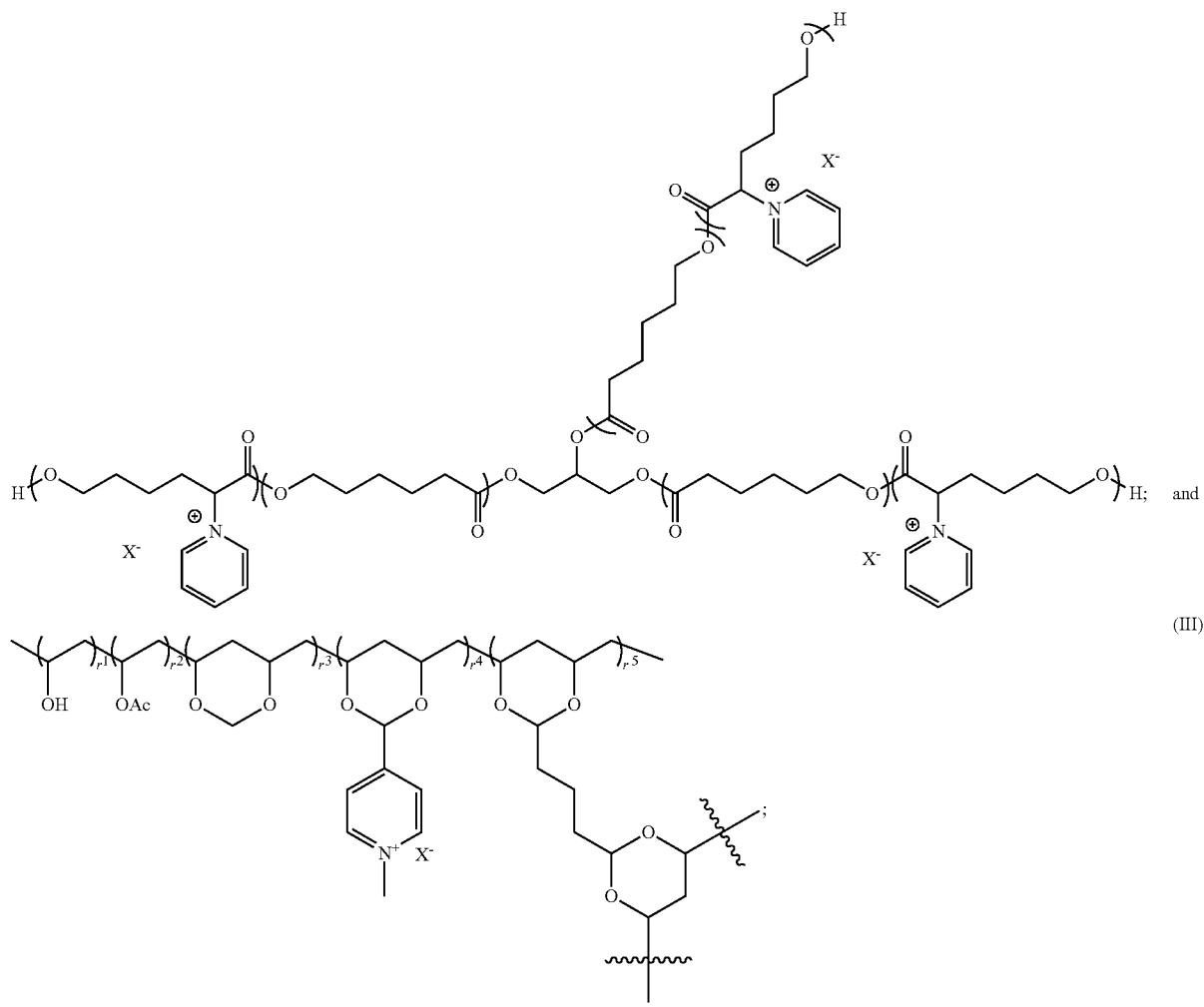
wherein the parentheses in each of Formulas IA-D and IIA-D indicate repeat units of values n, p, and $r^{1-5}$.
18. The electrochromic device of claim 13, wherein the cationic polymer is cross-linked with a cross-linking agent.
19. The electrochromic device of claim 18, wherein the cross-linking agent is a di-isocyanate, a tri-isocyanate, a polyisocyanate, or a dialdehyde.
* * * * *